US007266241B2

(12) United States Patent
Cooper et al.

(10) Patent No.: US 7,266,241 B2
(45) Date of Patent: *Sep. 4, 2007

(54) SECONDARY COLOR MODIFICATION OF A DIGITAL IMAGE

(75) Inventors: Brian C. Cooper, Foxborough, MA (US); Robert Gonsalves, Wellesley, MA (US); Robert Alan Paoni, Nashua, NH (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/197,392

(22) Filed: Aug. 4, 2005

(65) Prior Publication Data

US 2005/0271267 A1    Dec. 8, 2005

Related U.S. Application Data

(63) Continuation of application No. 10/887,054, filed on Jul. 8, 2004, now Pat. No. 6,928,187, which is a continuation of application No. 10/242,806, filed on Sep. 13, 2002, now Pat. No. 6,763,134, which is a continuation of application No. 09/545,644, filed on Apr. 7, 2000, now Pat. No. 6,477,271.

(51) Int. Cl.
*G06K 9/00* (2006.01)

(52) U.S. Cl. .................................. 382/167; 345/594

(58) Field of Classification Search ................ 382/162, 382/167; 345/593, 594, 595; 715/700
See application file for complete search history.

(56) References Cited

U.S. PATENT DOCUMENTS

| 5,313,275 | A | * | 5/1994 | Daly et al. .................. 348/592 |
| 5,877,772 | A | * | 3/1999 | Nomura et al. ............. 345/594 |
| 6,850,249 | B1 | * | 2/2005 | Gu ............................. 345/623 |
| 6,928,187 | B2 | * | 8/2005 | Cooper et al. .............. 382/167 |

\* cited by examiner

*Primary Examiner*—Phuoc Tran
(74) *Attorney, Agent, or Firm*—Peter J. Gordon; John A. Hamilton

(57) ABSTRACT

An ellipsoid chroma region of a chroma plane may be defined to specify a range of chromas for which a secondary chroma modification is to be applied, and to determine an output chroma for each chroma of the chroma plane based on the ellipsoid chroma region. Further, two or more different-shaped chroma regions of a chroma plane may be defined and manipulated, each chroma region specifying a range of chroma for which a secondary chroma modification is to be applied, and to determine an output chroma for each chroma of the chroma plane based on the two or more different-shaped chroma regions. Also, chroma-matching techniques may be used to define and manipulate the chroma region of a chroma plane that specifies a range of chroma for which a secondary chroma modification is to be applied, and an output chroma may be determined for each chroma of the chroma plane based on the chroma region.

26 Claims, 18 Drawing Sheets

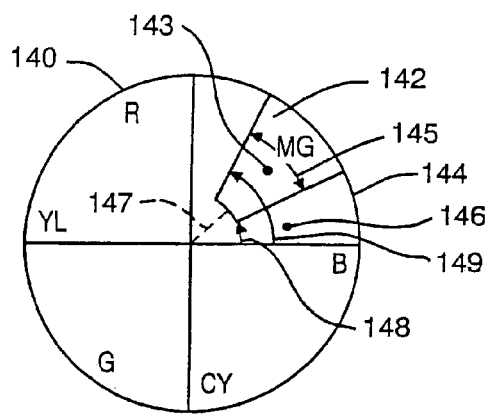
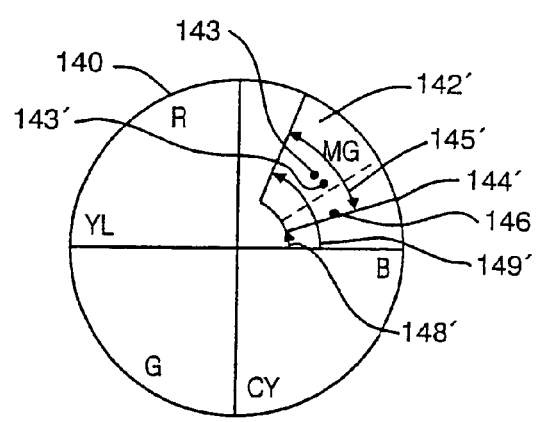
FIG. 10A                    FIG. 10B
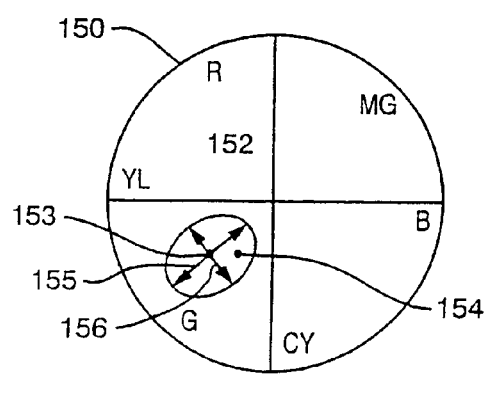
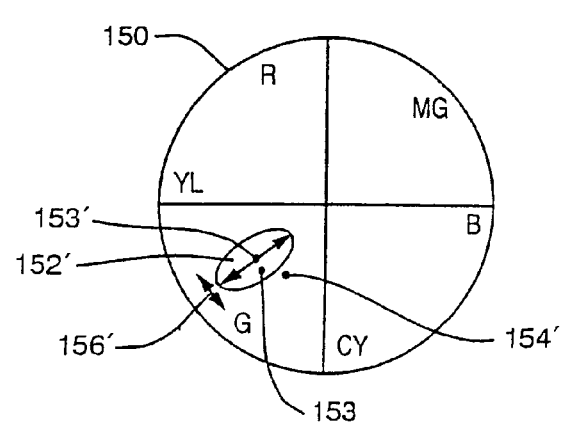
FIG. 11A                    FIG. 11B

SECONDARY COLOR MODIFICATION OF A DIGITAL IMAGE

CROSS REFERENCE TO RELATED APPLICATIONS

This patent application claims the benefit under 35 U.S.C. §120, and is a continuation application of application Ser. No. 10/887,054, filed Jul. 8, 2004, now issued as U.S. Pat. No. 6,928,187, which is a continuation application of application Ser. No. 10/242,806, filed Sep. 13, 2002, now issued as U.S. Pat. No. 6,763,134, which is a continuation application of application Ser. No. 09/545,644, filed Apr. 7, 2000, now issued as U.S. Pat. No. 6,477,271; all of which are incorporated herein by reference.

BACKGROUND

Color modification is a class of operations that may be performed an image (e.g., a digital image) to change colors of the image. Such color modifications may be made to correct color errors due to process errors and to adjust the colors used in the video for artistic expression. Such color modifications may include enhancing contrasts or color in an image to give a program an overall "look," or applying special effects to selected segments. Other color modifications may be made by a user (e.g., an editor or colorist) to correct problems with color or lighting resulting from the source of the media. Such corrections may include color balancing for camera and lighting differences, correcting for film processing differences, matching colors and tones from shot to shot, or adjusting video levels for differences in source tapes, source decks, etc.

Such color modifications may be made on a computer or other digital-based system such as, for example, a digital non-linear editing (DNLE) system. DNLE is a process by which digital media may be edited. DNLE, as the name implies, is performed on digital media stored as data in digital media files on a digital random access medium. DNLE may be conducted in a non-linear fashion because the digital media files in which the digital media is stored can be randomly accessed. Thus a user may access a piece of the digital media without having to proceed sequentially through other pieces of the digital media stored in the same or other digital media files. More than one user also may be able to access different pieces of the same digital media contemporaneously. The digital media may be a digitized version of a film or videotape or digital media produced through live capture onto a disk of a graphics or animation software application. Example commercial DNLE systems include the Media Composer® or Symphony video production systems or NewsCutter® news editing system available from Avid Technology, Inc. For a more detailed description of DNLE, see *Digital Nonlinear Editing, New Approaches to Editing Film and Video*, 1993, by Thomas Ohanian (hereinafter Ohanian). For a more detailed description of computer graphics in general, see *Computer Graphics Principles and Practice*, second edition, 1997, by James D. Foley et al. (hereinafter Foley).

Digital images are comprised of an array of picture elements called pixels. For a given image, color modifications may be applied to all pixels in the image or pixels comprising a portion of the image. In digital video signal processing, a variety of data formats can be used to represent the color of pixels within a digital image. Formats may be classified into two major categories: composite signals and component signals. Component formats represent a color as multiple components, each component defining a value along a dimension of the color space in which the color being represented is defined. A composite video signal is an analog signal that uses a high frequency subcarrier to encode color information. The subcarrier is a sinewave of which the amplitude is modulated by the saturation of the color represented by the signal, and the hue of the color is encoded as a phase difference from a color burst. Analog composite signals are generally used to broadcast television video signals.

There are a variety of color spaces corresponding to component formats that may be used to represent color such as, for example, RGB, HSL, and YCbCr. RGB (Red, Green, Blue) color space represents a color with a red component, a green component and a blue component. In a three-dimensional coordinate system, each component of the RGB color space represents a value along an axis, the combination of the values defining a cubic color space.

The HSL (Hue, Saturation, Lightness or Luminance) color space represents a color with a hue component, H, a saturation component, S, and a luma component, L. In a three-dimensional HSL coordinate system, the luma component, Y, represents a value along a luma axis, the hue component, H, represents the angle of a chroma region with respect to the luma axis and the saturation component, S, represents the magnitude of the chroma region. The combination of the values defines a hexagonal cone-shaped color space.

The YCbCr color space represents a color with a luma component Y, and two chroma components, Cr and Cb. In a three-dimensional YCbCr coordinate system, each component of the YCbCr color space represents a value along an axis, the combination of the values defining a cylindrical color space around the luma axis. The chroma components, Cr and Cb, define the chroma region.

In either HSL or YCbCr color space, the luma component, L or Y, respectively, may be used independently to represent a pixel in a black and white (i.e. grayscale) image to be displayed, for example, with a black and white monitor. A pixel color represented with only a luma value may be referred to herein as having a grayscale value.

Further, in both HSL and YCbCr color space, the components defining a chroma (i.e., chrominance) chroma region, HS or CbCr, respectively, may be referred to herein as chroma components and may be referred to as defining a chroma. A plane defined by all possible values of chroma components for a given value of a luma may be referred to herein as a chroma plane. A two-dimensional region defined for such a chroma region may be referred to herein as a two-dimensional chroma region or a chroma region. Such a chroma region may be orthogonal to a luma axis. The term "chroma" may be used herein interchangeably with the term "chrominance."

Color modifications may be specified to affect all pixels of a digital image or less than all pixels of a digital image. A color modification defined to affect less than all pixels of a digital image may be referred to herein as a "secondary color modification". A user may specify a secondary color modification by specifying that color modification be applied only to pixels that meet certain criteria such as, for example, positional (e.g. coordinate-based) and color-space-based (i.e. component-based) criteria. For color space-based criteria, a user may specify, for example, that a secondary color modification be applied to all pixels of a digital image that have a chroma component that has a value within a certain range. In an HSL color space, for example, a user may specify that the secondary color modification be applied to all colors that fall within a range of hue and saturation values.

Various color modifications and support for managing them are described in U.S. patent application Ser. No. 09/392,823, entitled "Modification of Media with Common Attributes on a Digital Nonlinear Editing System" (the Gonsalves I application) by Robert Gonsalves and Michael D. Laird filed Sep. 9, 1999, and in U.S. patent application Ser. No. 09/293,732, entitled "Multi-tone Representation of a Digital Image on a Digital Nonlinear Editing System" (the Gonsalves II application), by Robert Gonsalves, filed Apr. 16, 1999. The contents of both these applications are herein incorporated by reference. Suitable commercial systems for color modification include the Media Composer® and Symphony video production systems, and Avid Media Illusion™, all available from Avid Technology, Inc. The Avid Media Illusion Reference Guide, available from Avid Technology, Inc. is herein incorporated by reference. Other commercial software applications may be used, including Adobe Photoshop from Adobe Systems Inc., Flame® from Discreet Logic, Inc, a division of Autodesk, Inc., and Renaissance 8:8:8 from daVinci Systems, Inc.

Some color modification systems that provide secondary color modification allow a user to define a chroma region for which to apply a secondary color modification. To define a chroma region, such systems typically provide a standard shape such as, for example, a rectangle or wedge-like shape. A rectangle may define a chroma region using Euclidean coordinates, such as for example, Cr and Cb, where both Cr and Cb represent a displacement from a luma axis on a chroma plane. A rectangle may be defined as a chroma region bound by a minimum and maximum Cr value and a minimum and maximum Cb value.

A wedge-like shape may define a chroma region using polar coordinates, such as, for example, H and S, where H represents an angular displacement between a radial line and a reference radial line, both lines extending radially from the luma axis on a chroma plane, and S represents a magnitude of such a radial line. A wedge shape may be defined as a chroma region bound by a minimum and maximum saturation and a minimum and maximum hue.

SUMMARY

A problem with typical color modification systems that provide secondary chroma modifications is that the standard shapes that a user may define are sometimes not ideal for performing secondary chroma modification on discrete spatial regions of a digital image such as, for example, a section of sky or a person's skin. Specifically, the standard shapes may not provide a user the capability to specify a chroma region that closely correlates to a range of chroma values for the pixels of a discrete spatial region. Thus, the defined shape may capture chroma not intended by a user to be chroma modified, and may not capture other chroma that the user intended to chroma modify.

The range of many discrete spatial regions of a digital image, when mapped to a chroma plane, form approximately an ellipsoid oriented along a radial line extending from the luma axis of a chroma region. For the reasons described above, standard chroma region shapes such as, for example, rectangles and wedge-shapes may be ill-suited to represent such ellipsoids. Further, a typical wedge-like chroma region is defined to include, for each value of hue within such chroma region, the maximum value of saturation allowed for the chroma plane. Such a wedge-shaped region may be ideal for highly saturated images (i.e. an image having relatively many pixels that have a high saturation value such as, for example, a bright yellow frisbee on a sunny day); however, many digital images and, consequently, many discrete spatial regions of a typical digital image, are lowly saturated. Consequently, a wedge-like chroma region may capture several undesired chroma.

Another problem with typical color modification systems that provide secondary chroma modifications is that such a system does not provide a convenient means for defining an manipulating a chroma region that closely correlates to a discrete region of an actual digital image. Typically, a user must define the chroma region, and then apply it to a digital image to determine if the defined chroma region captures all or enough of the pixels of the discrete spatial region. If the desired pixels are not captured, the user may repeatedly redefine the chroma region until the chroma region captures the desired pixels.

Accordingly, in an aspect, an ellipsoid chroma region of a chroma plane may be defined to specify a range of chromas for which a secondary chroma modification is to be applied, and an output chroma for each chroma of the chroma plane may be determined based on the ellipsoid chroma region.

In another aspect, two or more different-shaped chroma regions of a chroma plane may be defined and manipulated, each chroma region specifying a range of chroma for which a secondary chroma modification is to be applied, and an output chroma for each chroma of a chroma plane may be determined based on the two or more different-shaped chroma regions.

In yet another aspect, chroma-matching techniques may be used to define and manipulate a chroma region of a chroma plane that specifies a range of chroma for which a secondary chroma modification is to be applied, and an output chroma for each chroma of the chroma plane may be determined based on the chroma region.

The several embodiments of a system and method of performing secondary color modification described herein may be implemented using software, hardware, firmware, or any combination thereof, and may be embodied in a computer program product.

BRIEF DESCRIPTION OF FIGURES

FIG. 3a is a graph illustrating an example embodiment of a chroma wheel having multiple ellipsoid;

FIG. 3b is a graph illustrating an example embodiment of a chroma wheel having multiple modified chroma regions corresponding to the chroma regions of FIG. 3a;

FIGS. 10a-10b are graphs illustrating a result of expanding a chroma region;

FIGS. 11a and 11b are graphs illustrating a result of decreasing a chroma region;

DETAILED DESCRIPTION

Figure 1A:
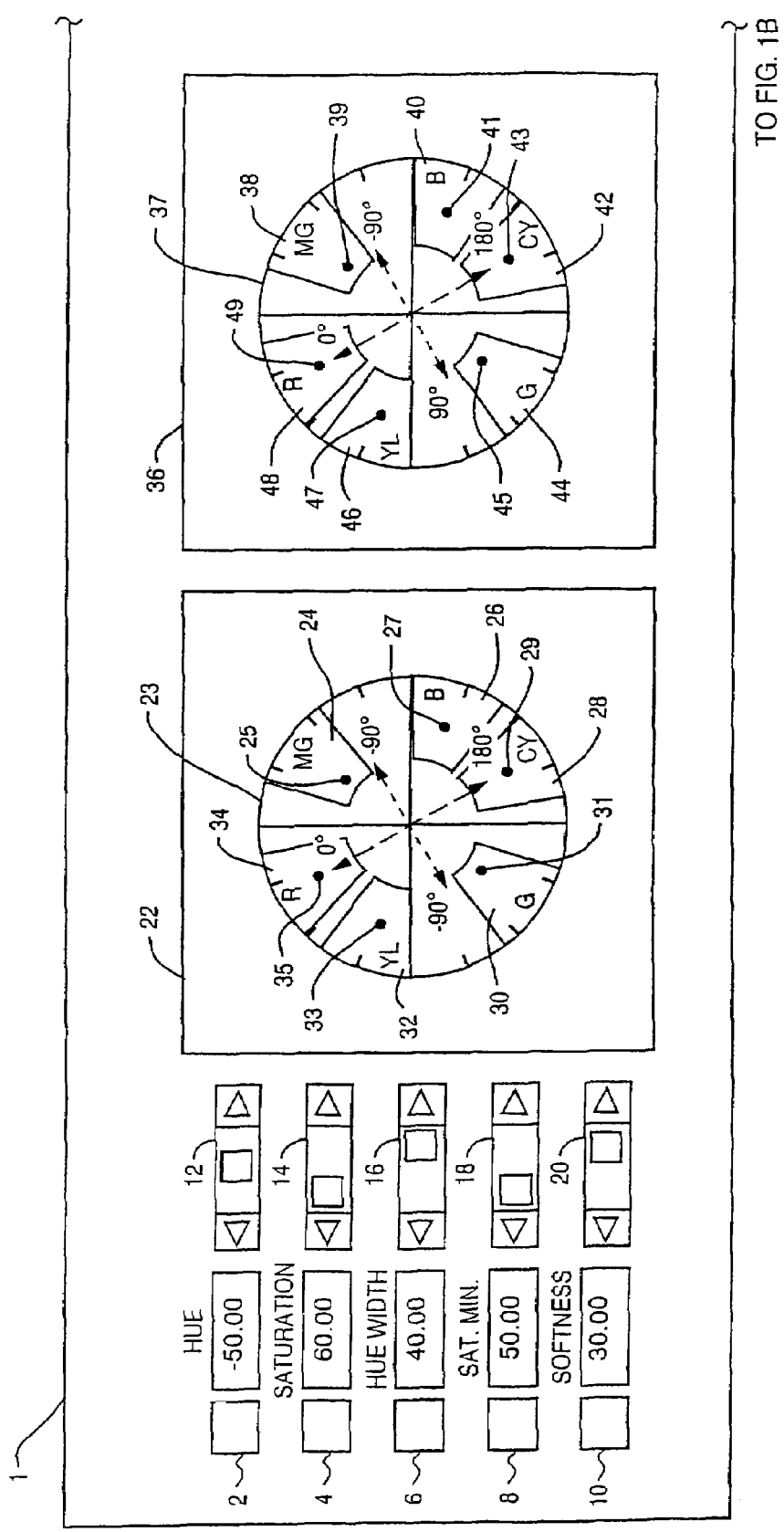
FIG. 1 is a block diagram illustrating an example embodiment of a user interface for defining and manipulating secondary chroma modification parameters.
Figure 1B:
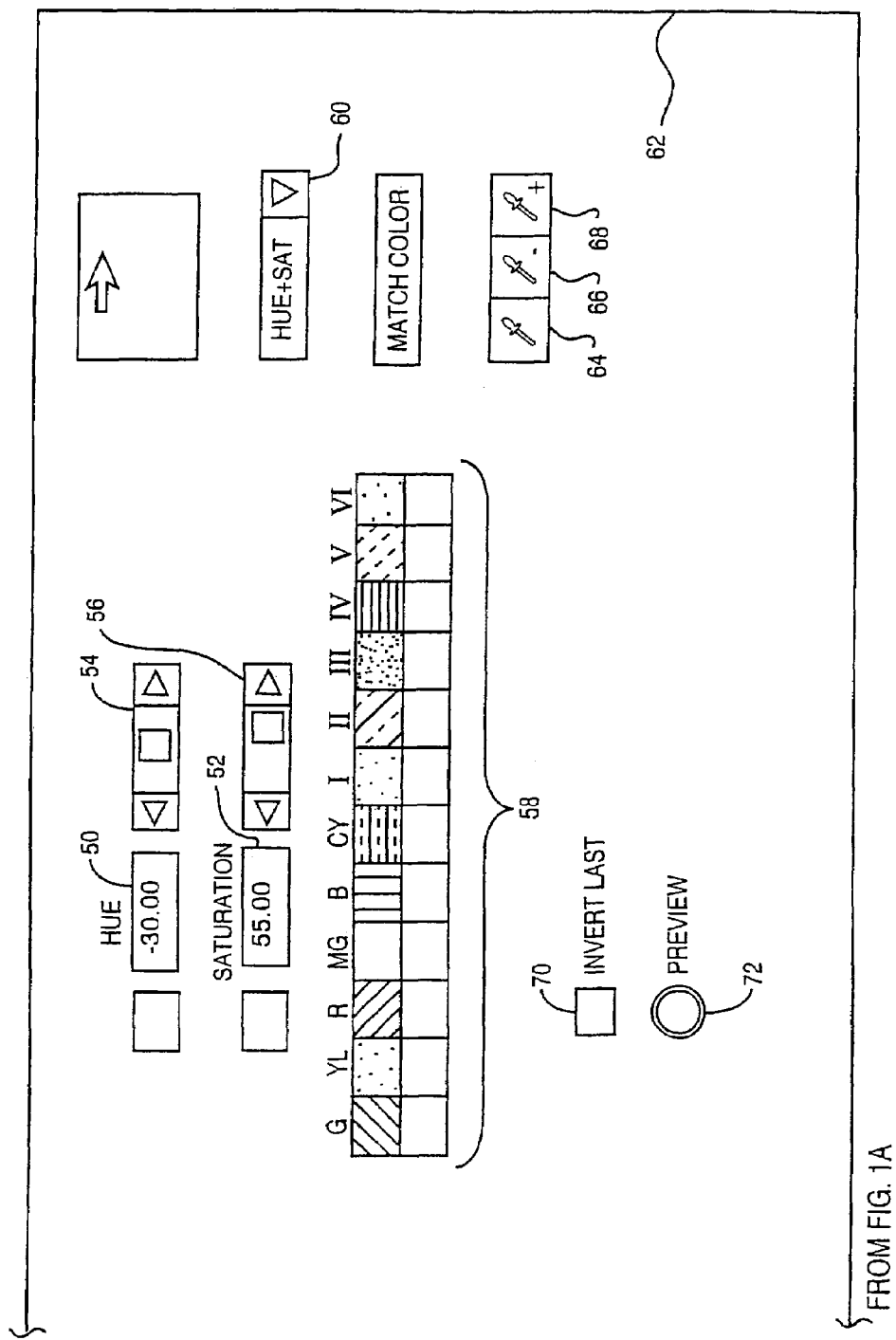

FIG. 1 is a block diagram illustrating an example embodiment of a user interface 1 that may be used to define and manipulate one or more chroma regions (i.e., chroma vectors) on a chroma plane, and, for each chroma region, define chroma modification to be performed on the chroma region. To define a chroma region, the user interface 1 may allow a user to enter a set of chroma region parameters, and to define a chroma modification for a chroma region. The user interface 1 also may allow a user to enter a set to chroma modification parameters. One or more of the defined chroma regions and corresponding chroma modification may be used to determine output chromas for one or more chromas of the chroma plane. These output chromas may be applied to pixels of a digital image to modify the chroma of one or more pixels of a digital image.

User interface 1 may provide a plurality of controls for entering chroma region parameters that define (and subsequently change) a chroma region such as, for example, region textboxes 2-10, region input sliders 12-20, chroma region graph 22, and chroma match controls 60 and 62. Further, user interface 1 may provide a user a plurality of controls to enter chroma region parameters that change an existing chroma region such as, for example, "eye droppers" 64-68. Each of these controls is discussed in more detail below.

Although user interface 1 defines a chroma region in HSL color space, other color spaces may be used, such as, for example, YCbCr or HSV.

A user may define a chroma region using region textboxes 2-10 and region sliders 12-20. A user may define a hue of the center point of chroma region using hue textbox 2 and its corresponding hue slider 12. The hue textbox 2 and hue slider 12 may be configured to allow a user to input a value from −180° to 180°, or, alternatively, from 0 to 2 pi radians or some other units.

A user may enter a saturation for the center point of an chroma region using saturation textbox 4 or saturation slider 14. Saturation textbox 4 and slider 12 may be configured to allow a user to enter a value between 0 and 100, wherein 0 may represent the luma axis of a chroma plane (e.g., center of chroma wheels 23 and 37) and 100 may represents a maximum allowed saturation of a chroma plane (e.g., perimeter of chroma wheel 23).

A user may enter a hue width of a chroma region using hue width textbox 6 and hue width slider 16. Hue width textbox 6 and slider 16 may be configured to allow a user to enter a hue width from 0 to 180° (although one may want to restrict hue width to a reasonable value). Optionally, hue width textbox 6 and slider 16 may be configured to have a default value such as, for example, 30°.

Although a control may not be provided to define the lightness (i.e. luminance) of the chroma region, a lightness value may be internally maintained. By default, such a lightness may be set to 0.5, where 1.0 is white and 0.0 is black. The lightness of the chroma region may be set at a value other than a default value, particularly when the chroma match controls are used, as is described in more detail below in connection to FIG. 9 below. A lightness value of a color may also be used when converting between color spaces such as HSL, RGB and YCbCr as described below in connection to FIG. 9

A user may enter a minimum saturation for a chroma region using minimum saturation textbox 8 and minimum saturation slider 18. As described below, these controls may only be appropriate for certain color region shapes such as, for example wedges, and may not be appropriate for other color region shapes such as, for example, an ellipsoid. Minimum saturation textbox 8 and slider 18 may be configured to allow a user to enter a value from 0 to the saturation value of the center point of the chroma region. Minimum saturation textbox 8 and slider 18 may be configured to have a default setting such as, for example, 10.

For a user to define a color region shape that requires a saturation width (as opposed to a saturation minimum) such as, for example, an ellipsoid, the user interface may provide controls for entering the saturation width of a chroma region such as, for example, a saturation width textbox and a saturation width slider. The saturation width textbox and slider may be configured to allow a user to enter a value from a minimum value of saturation for the chroma region to the maximum value of saturation for the chroma region such as, for example, 0 and 100, respectively. Optionally, the saturation minimum value may not be in units of saturation but in units relative to the maximum allowable size for an ellipsoid. Accordingly, the saturation width textbox and slider may be configured to allow values ranging from 0 to 50% of the maximum width of an ellipsoid.

A user may view a graphical representation of a chroma region and alter the chroma region parameters of a chroma region using chroma region graph 22. Chroma region graph 22 may include a two-dimensional chroma wheel 23 representing the hue and saturation dimensions of an HSL chroma plane. On chroma wheel 23, the letter B represents approximately a hue of blue, the letters MG represent approximately a hue of magenta, the letter R represents approximately a hue of red, the letters YL represent approximately a hue of yellow, the letter G represents approximately a hue of green and the letters CY represent approximately a hue of cyan. As indicated in chroma wheel 23, the hue of red corresponds to approximately 0° and a hue of cyan corresponds approximately to 180° (or −180°). The perimeter of the chroma wheel 23 may represent a maximum saturation such as, for example, 100.

To define chroma regions, user interface 1 may provide a user the ability to define chroma regions having different shapes such as, for example, wedges and ellipsoids. Wedge-shaped and ellipsoid color regions will now both be described in detail in connection to chroma region graph 22.

Figure 2:
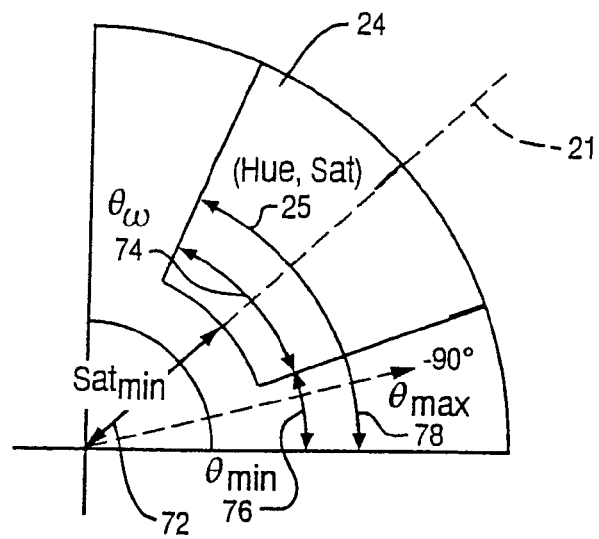
FIG. 2 is a graph illustrating an example embodiment of a wedge-shaped chroma region.

Chroma region input graph 22 allows a user to define input wedge-shaped chroma regions 24, 26, 28, 30, 32 and 34 with respect to chroma wheel 23. FIG. 2 is a graph illustrating an example embodiment of wedge-shaped chroma region, chroma region 24, in more detail. Chroma region 24 has a wedge-shape centered about a radial vector 21 having a hue value equal to the centerpoint hue value of the chroma region 24. The chroma region 24 is defined by chroma region parameters: centerpoint 25 having a hue and saturation value; a minimum saturation 72; and hue width 74. Chroma region is also defined by minimum and maximum hue 76 and 78, respectively, which each may be derived from the color region parameters.

A user may manipulate chroma regions using several techniques. For example, a user may click on the center point of the chroma region 24, a drag the center point to a new location. This clicking and dragging may have the effect of changing the hue and saturation values of the chroma region 24. A user may also manipulate the chroma region 24 by clicking on and dragging a boundary arc defined by the minimum saturation 72, or by clicking on either of the boundary line defining the minimum hue of 76 or the maximum hue 78. Optionally, if the user drags one of the minimum or maximum hue boundary lines, then the other hue boundary may adjust equivalently about hue line 21.

Figures 3A, 3B:
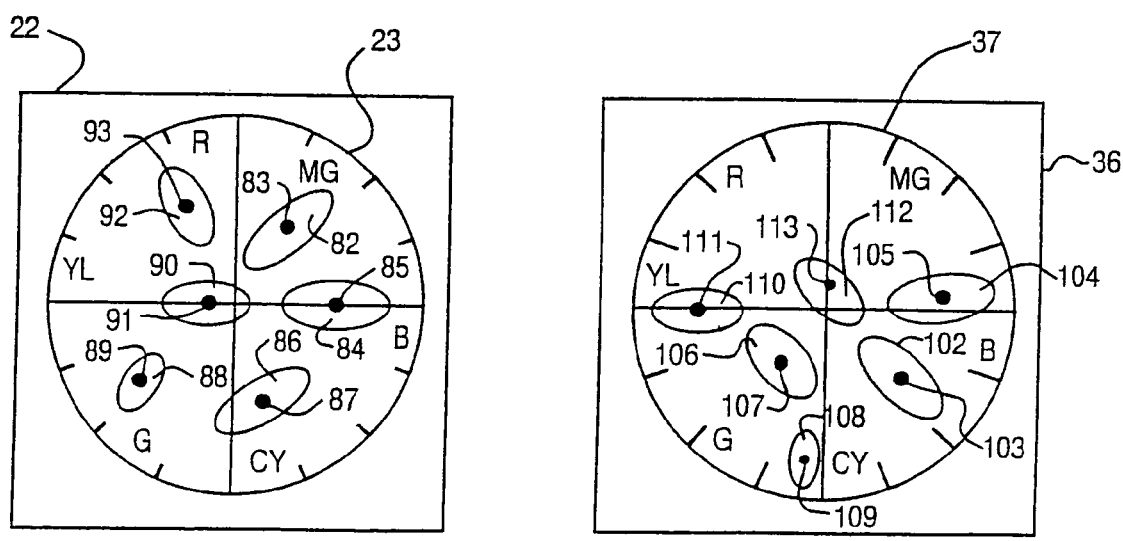

In addition to allowing users to define standard wedged-shaped chroma regions, the user interface 1 may also allow users to define non-wedge-shaped chroma regions such as, for example, ellipsoid chroma regions. FIG. 3A illustrates an embodiment of chroma region graph 22 wherein ellipsoid chroma regions are graphically represented. Graphical chroma region 22 may include graphical ellipsoid chroma regions 82, 84, 86, 88, 90 and 92 having center points 83, 85, 87, 89 and 91, respectively.

Figure 4:
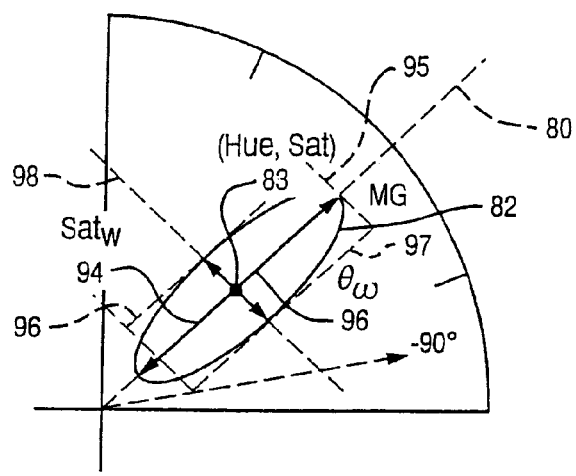
FIG. 4 is a graph illustrating an example embodiment of an ellipsoid chroma region.

FIG. 4 is a graph illustrating an example ellipsoid chroma region 82 in more detail. Chroma region 82 may be defined by chroma region parameters: center point 83 having a hue and saturation value, saturation width 94 and hue width 96. Chroma region 82 may also be defined by minimum saturation 94, maximum saturation 95, minimum hue 97 and maximum hue 96, which each may be derived from the chroma region parameters. Chroma region 82 may have a first axis 80 intersecting the center point 83 and radially-aligned along a vector extending from the origin of chroma wheel 23, and have a second axis 98 intersecting the center point 83 and tangentially-aligned with a circle having center point 83 on its perimeter a center point at the origin of chroma wheel 23.

User interface 1 may also provide a plurality of controls for entering a softness of a chroma region such as, for example, softness textbox 10 and softness slider 20. Applying softness to a color modification (e.g., chroma modification) has the effect of applying a smoother or more gradual visual transition between boundaries of pixels of a digital image to which a secondary color modification is applied and pixels for which the modification was not applied. The softness controls 10 and 20 may define a spatial displacement from boundaries of a chroma region. A chroma located within a softness region defined by this displacement may have a weighted chroma modification applied to it. The weighting may be in proportion to the displacement between the chroma and the nearest boundary of the chroma region.

A positive softness value may indicate a softness displacement outside of a boundary the chroma region, while a negative softness value may indicate softness displacement inside of a boundary the chroma region. The chroma region graph 22 and the chroma modification graph 37 may each be configured to display a softness region corresponding to a chroma region.

Figure 5:
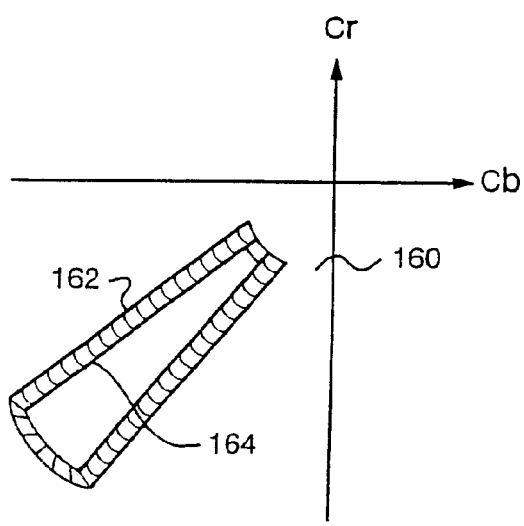
FIG. 5 is a graph illustrating an example embodiment of a combination of a wedge-shaped chroma region and a softness region.

FIG. 5 is a graph 160 illustrating an example embodiment of a softness region 164 that may result from applying a negative softness value to a wedge-shaped region 162.

Figure 6:
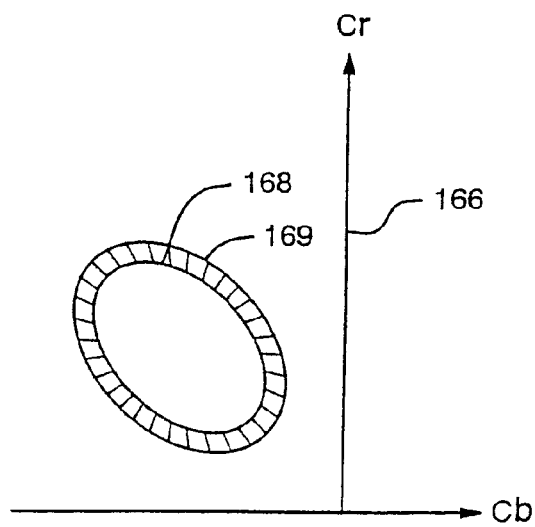
FIG. 6 is a graph illustrating an example embodiment of a combination of an ellipsoid chroma region and a softness region.

FIG. 6 is a graph 166 illustrating an example embodiment of a softness region 169 that may result from applying a positive softness value to a wedge-shaped region 168. Determining the boundaries of a softness region in connection to a chroma region is discussed in more detail below in connection to FIG. 12.

User interface 1 may also provide a plurality of controls for entering chroma modification parameters that define a chroma modification to be applied to a chroma region such as, for example, chroma modification graph 36, modification textboxes 50 and 52, modification sliders 54 and 56, modification graph 36, and chroma match controls 60 and 62.

A user may define a change in hue and a change in saturation for a chroma region using modification textboxes 50 and 52 and sliders 54 and 56. A user may select a hue for a new center point of a chroma region using hue textbox 50 and hue slider 54. The modification hue textbox 50 and slider 54 may be configured to allow a user to select a hue value from −180° to 180°.

Modification saturation textbox 52 and modification saturation slider 56 allow a user to select a saturation value for a new center point of a chroma region. The output saturation textbox 52 and slider 56 may be configured to allow a user to enter a value between 0 and 100.

Each graphical representation of a chroma region such as, for example, 24, 26, 28, 30, 32 and 34, may have a corresponding graphical representation of a modified chroma region (hereinafter, modified chroma region) such as, for example, graphical modified chroma regions 38, 40, 42, 44, 46 and 48, respectively. Each modified chroma region may represent the result of applying the chroma modification parameters to the chroma region defined by a corresponding set of chroma regions parameters. Specifically, for wedge-shaped chroma regions, modified chroma region represents the effect of rotating the hue and offsetting the saturation of the corresponding chroma region, as determined by the difference between hue and saturation of the chroma region's center point values and the hue and saturation defined by the chroma modification's center point values, respectively.

A user may manipulate a modification for a chroma region by clicking and dragging the center point of one of the modified chroma regions such as, for example, the center point 39 of modified chroma region 38. This clicking and dragging may have the effect of changing the modification hue and the modification saturation.

For example, graphical chroma region 24 and region textboxes 2-8 and sliders 12-18 define a chroma region having a center point value at a hue of −50° and a saturation of 60 (i.e., [−50, 60]), a hue width of 40°, and a minimum saturation value of 50. A modification to be applied to the chroma region may be represented by modified chroma region 38, modification textboxes 50 and 52 and sliders 54 and 56 to have a center point at a hue value of −30° and a saturation value of 55 (i.e., [−30, 55]). Therefore, all chromas within the chroma range defined by the chroma region (graphically represented by graphical chroma region 24) will have their hue rotated 20° (−50−−30) and have their saturation decreased by 5 (60-55).

Analogously, each graphical representation of an ellipsoid chroma region such as, for example, the chroma regions of FIG. 3a may be represented by a corresponding graphical representation of a modified chroma region such as, for example, the modified chroma regions of FIG. 3b. Specifically, modified chroma region 102 having a center point 103 may correspond to graphical chroma region 82 and; modified output chroma region 104 having a center point 105 may correspond to graphical chroma region 84; modified chroma region 106 having a center point 107 may correspond to graphical chroma region 86; chroma region 108 having a center point 109 may correspond to graphical chroma region 88; modified chroma region 110 having a center point 111 may correspond to graphical chroma region 90; and modified chroma region 112 having center point 113 may correspond to graphical chroma region 92.

The chroma region graph 22 and the chroma modification graph 36 may each provide the ability to graphically display multiple graphical chroma regions of different shapes simultaneously. In contrast, each textbox/slider combination such as, for example, 2 and 12 or 50 and 54, may only represent chroma parameters associated with a single selected chroma region.

A selection panel 58 may be provided to allow a user to select one of the input/output chroma region pairs, where each column of the selection panel 58 may include a selection button and a chroma swatch corresponding to a chroma region. Each chroma swatch may represent the chroma of the centerpoint of its corresponding chroma region. The user interface may include symbols above each chroma swatch that identify the swatch's corresponding chroma region such as, for example, G, YL, R, MG, B, CY, I, II, III, IV, V and VI. The chroma swatches of the chroma region selection panel 58 may change in real time to reflect a change to the center point of the color swatch's chroma region.

To define chroma regions and chroma modifications, user interface 1 may enable a user to define chroma regions and modifications for a segment of media, where the segment may be a subcomponent of a media composition, and may be derived from other media segments. Optionally, a chroma region and modification may be defined to apply to two or more segments of media by selecting a source or composition (i.e. program) relationship for the chroma region and modification. For example, for a current segment, a user may select a source relationship attribute such as, for example, master clip, for which a color modification is to be defined. The source relationship indicates that any chroma region and modification defined for the current segment may be persisted such that the chroma region and modification may be applied to other segments derived from a same master clip as the current segment. A chroma region and modification defined for a source relationship of a segment may be referred to herein as a source modification. For more details regarding defining color modifications for media segments in accordance with source and composition relationships, see the Gonsalves I application.

In regard to composition relationships, for a current segment, a user may select a composition relationship attribute such as, for example, sequence, for which a color modification is to be defined. The composition relationship indicates that any chroma region and modification defined for the current segment may be persisted such that the chroma region and modification may be applied to other segments from a same sequence as the current segment. A chroma region and modification defined for a composition relationship of a segment may be referred to herein as a composition modification.

As described above, user interface 1 enables a user to define two or more chroma regions, possibly of different shapes, and their corresponding chroma modifications. It is possible that two or more of these chroma regions may define overlapping chroma ranges. Optionally, the user interface may be configured such that certain chroma regions have precedence over other chroma regions. Accordingly, for chroma regions having overlapping chroma regions, the chroma modification corresponding to the chroma region having higher precedence will be applied.

Alternatively, when two or more chroma regions define overlapping chroma ranges, the chroma regions may be applied sequentially. If chroma regions are applied sequentially, the chroma modification defined by a chroma parameter set is applied to the output chromas resulting from application of the previous chroma parameter set. For example, if a first chroma modification changed all green chromas to yellow chromas, and a second chroma region changed all yellow chromas to blue chromas, then the result of applying the first and second chroma regions sequentially would be to change all green and yellow chromas to blue chromas. Specifically, after application of the first chroma parameter set, all greens would then be yellow. Then, if the second chroma parameter set is applied, all of the original yellow and the yellow resulting from the application of the first chroma region are changed to blue.

Optionally, the user may define the order in which each chroma region and corresponding chroma modification is applied. Alternatively, the chroma regions corresponding chroma modifications may be applied in a default order such as, for example, source modifications before program modifications, left-to-right, and wedge-shaped chroma regions before ellipsoid regions, or any combination thereof.

User interface 1 may provide a preview control 72 that provides the capability to preview the results of applying one or more chroma regions and corresponding chroma modifications to a digital image. The resulting image may show all pixels that have a chroma located within one or more chroma regions as the output chroma resulting from the application of the corresponding chroma modifications. In contrast, the resulting image may show all pixels that have a chroma located outside (i.e., not within) any of the chroma regions as a grayscale value. Thus, previewing the application of one or more chroma regions and corresponding chroma modifications to a digital image may have an effect of highlighting pixels of an image that will be affected by an actual application of the one or more chroma regions and corresponding chroma modifications to the image. Previewing is described in more detail below.

User interface 1 may provide an invert last control 70 that provides the capability to preview the inverse of the result of applying a chroma region and corresponding chroma modification to a digital image. Selecting the invert last control 70 may have essentially the inverse effect (hence the name) of previewing. Specifically, the resulting image may show all pixels that have a chroma located outside (i.e. not within) the chroma regions as the output chroma resulting from the application of the corresponding chroma modification, and show all pixels that have a chroma located within the chroma region as unchanged, or, alternatively, as a a as a grayscale value.

Optionally, the user interface 1 may provide the ability to invert more than one chroma regions and corresponding modifications, although this may produce nonsensical results for obvious reasons.

Chroma match control 62 may allow a user to define a chroma region or a chroma modification in terms of chromas selected from a color source such as, for example, a digital image or a color palette. A user may select chroma match control 62, the graphically select one or more chromas from a color source. A chroma region may be then be determined that includes all of the selected chromas. A user may select whether the selected chromas define an input or an output chroma region. Further, a user may select the shape of the chroma region such as, for example, a wedge or an ellipsoid, that the selected chromas create. Optionally, the shape of the chroma region may automatically be determined depending on the chromas selected.

For example, the saturation value of each chroma may be determined, and if the maximum saturation value of all of the determined saturation values exceeds a threshold value, a wedge-shape chroma region may be defined for the selected chromas. If the maximum value of all of the selected chromas does not exceed the threshold value then an ellipsoid value may be defined that includes the selected chromas.

Selecting a wedge-shape chroma region when a value exceeds a saturation threshold reflects the fact that wedge-shaped chroma regions may be a more appropriate shape for representing a subset of chromas that include chromas of high saturation. Accordingly, selecting an ellipsoid chroma region when the maximum saturation falls below a saturation threshold reflects that ellipsoids may be more appropriate for representing a subset of chromas that do not include chromas having a high saturation value.

A user may select what type of chroma match to apply using chroma type match control 60. Chroma match type may include hue match, saturation match, hue and saturation match and natural color match. If a user selects a hue match or a saturation match, only the hue or saturation, respectively, of the corresponding chroma region or chroma modification may be affected. Alternatively, if the user selects the hue and saturation match, both hue and saturation may be affected. If the user selects the natural color match, the hue and saturation may be affected in accordance with natural color matching as described in the Gonsalves I patent application.

Figure 7:
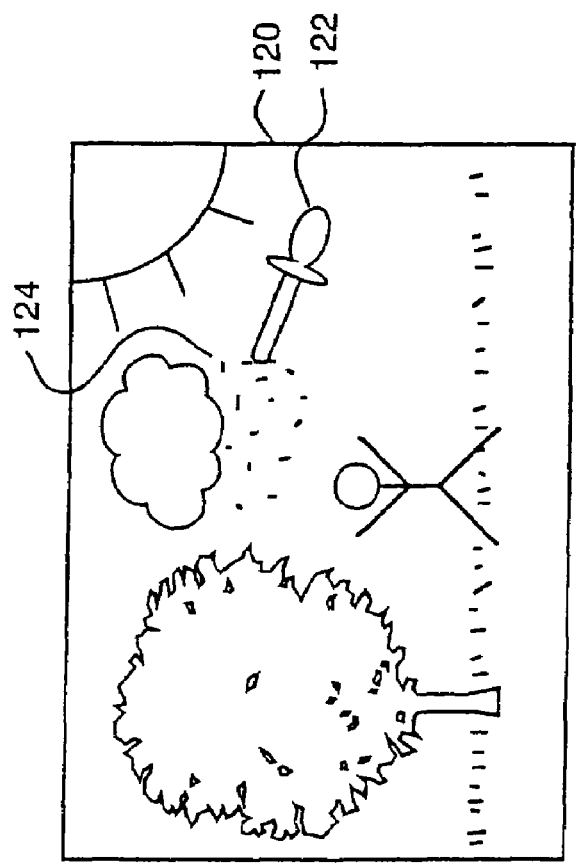
FIG. 7 is a diagram illustrating an example embodiment of an image.

FIG. 7 is a block diagram illustrating an example embodiment of an image 120. A user may select an icon from the user interface 1, such as, for example, a syringe 122 and drag the syringe around a section of the digital image 120 corresponding to a certain object within the digital image 120 such as, for example, a sky. By dragging the syringe 122, a user may select several pixels 122. The ability to drag and select a plurality of chromas of a common object such as the sky, allows a user to specify a chroma region that corresponds to a specific portion of the digital image 120.

Figure 8:
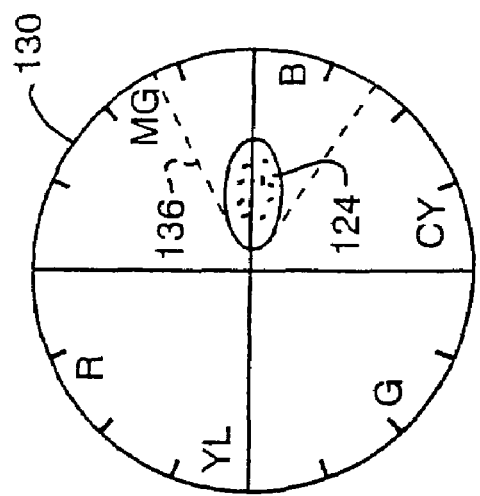
FIG. 8 is an example embodiment of an ellipsoid and a wedge-shaped chroma region resulting from selecting chromas.

FIG. 8 is an illustrative embodiment of a chroma wheel 130 that illustrates how the chromas 124 of the pixels 122 may map to a two-dimensional HSL chroma plane 130. An ellipsoid chroma region 138 or a wedge-shaped chroma region 136 may then be determined that includes each of the chromas 124.

Figure 9:
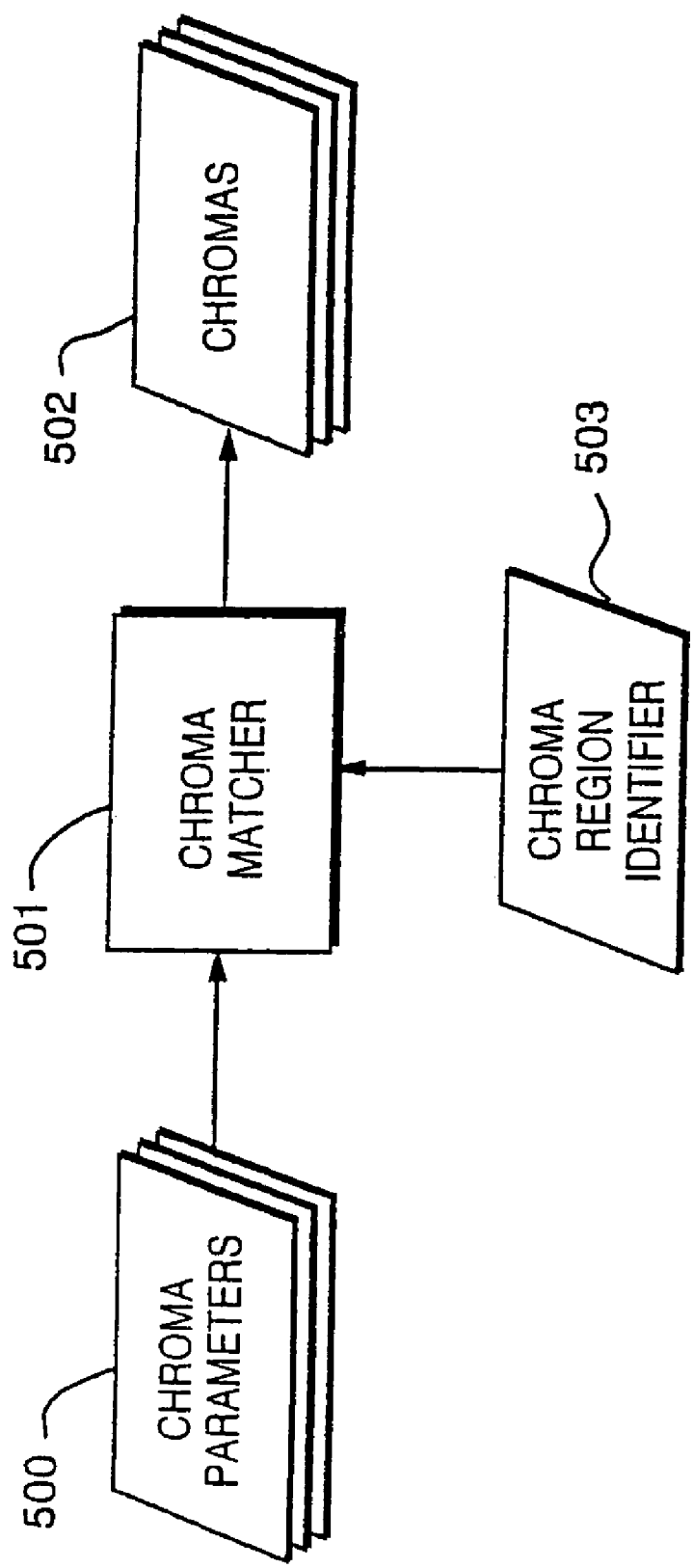
FIG. 9 is a data flow diagram illustrating an example embodiment of a system for matching chroma.

FIG. 9 is a data flow diagram illustrating an example embodiment of a chroma matching system 499. Chroma matching system 499 may include a chroma matcher 501 that may receive chromas 500 and a chroma region identifier 503 and generate a set of chroma parameters 502, which may be either chroma region parameters or chroma modification parameters. Optionally, the chroma matcher 501 may not receive a chroma region identifier, but may determine a chroma region automatically.

If the received chromas are of a color space different than the chroma plane for which the chroma matcher 501 determines chroma parameters 502, then the chromas may initially be converted to the chroma plane of the color matcher 501. For example, if the chromas 500 are defined in RGB color space and the chroma matcher operates in an CbCr chroma plane of the YCbCr color space, then the chroma matcher may include an RGB-to-YCbCr converter that converts from RGB color space to YCbCr color space. Such a converter may make the following conversions:

$Y=0.299000*R+0.587000*G+0.114000*B;$   Equation 1:

$Cb=-0.172588*R-0.338827*G+0.511416*B;$   Equation 2:

$Cr=0.511416*R-0.428247*G-0.083169*B.$   Equation 3:

If the chroma matcher operates in YCbCr color space, and the received chromas 500 are in RGB space, the chroma matcher 501 may operate as follows.

If a single chroma 500 is received to define a chroma modification, the chroma may be converted into HSL and become the chroma modification parameters hue_out (modification hue), sat_out (modification saturation), lightness_out (modification lightness), which define the chroma region modification. Converting from YCbCr to HSL may be achieved by converting from YCbCr color space and RGB color space and then to HSL color space. Converting from YCbCr may be achieved using the following equations:

Equation 4: $R = Y + 1.3707054 * Cr;$

Equation 5: $G = Y - 0.3364547 * Cb - 0.6981957 * Cr;$

Equation 6: $B = Y + 1.7324464 * Cb.$

To convert from RGB to HSL known algorithm may be used such as, for example, an algorithm derived from the algorithm in Foley, on page 595.

If more than one chroma 500 is received to define a chroma modification, each point may first be converted into YCbCr and the average of each component (Y, Cb, Cr) may be determined. These averages then may be converted into HSL to become chroma region modification parameters hue_out (modification hue), sat_out (modification saturation), and lightness_out (modification lightness), which together define the chroma region modification.

If a only a single chroma 500 is received to define a chroma region, the chroma may be converted into HSL and become the chroma region parameters: hue_in (center point hue), sat_in (center point saturation), and lightness_in (center point lightness). The other chroma region parameters hue_wid_in (hue width) and sat_min_in (saturation width) and softness may retain default values, or values previously defined for the chroma region.

If a user has not specified a particular chroma region for which to apply the selected chroma, then a chroma region having a center point hue closest in value to hue_in, and which currently is not enabled may be selected. Optionally, a chroma region of a particular shape (e.g., wedge) having the closest center point saturation value may be selected. If all chroma regions, or all chroma regions of a particular shape, are already enabled, then a chroma region that is last in a predefined order may automatically be selected.

If multiple chromas 500 are received, a color region may be defined that "fits" around the chromas as follows. First, each chroma may be converted into YCbCr and the average of each component (e.g., Y, Cb, Cr) may be determined. These averages may be used to determine CbCr chroma plane parameters: inCr (CbCr chroma region center point Cr coordinate), inCb (CbCr chroma region center point Cb coordinate), inSat (CbCr chroma region saturation) and inAngle (CbCr chroma region hue). Further, these averages may then be converted into HSL to become hue_in, sat_in, lightness_in.

Although the CbCr hue and saturation are not true HSL saturation value, they will be referred to as hue and saturation herein to indicate that they are the polar coordinate equivalents in YCrCb space to hue and saturation in HSL color space If a user specifies to define an ellipsoid chroma region using the chromas 500, an ellipsoid may be determined that "fits" the range of chromas 500. If a user specifies a wedge-shaped chroma region, an ellipsoid may be determined that "fits" the range of chromas 500.

If a user has not specified a chroma region or whether a wedge-shaped or ellipsoid chroma region is to be defined, an ellipsoid chroma region may first be fitted to the chroma region, and it may then be determined whether a wedge-shaped chroma region would better fit the range of chromas 500 as follows.

After determining the center point from a range of chromas as described above, a next step in defining an ellipsoid chroma region may be to determine the chroma region parameters hue_wid_in and sat_wid_in. To determine hue_wid_in and sat_wid_in, an algorithm, as represented by the following pseudocode, may be used:

Set maxAbsDevRadial=0, maxAbsDevTangential=0:
For each received chroma [Cr,Cb]:

$Cr=Cr-inCr;$ $Cb=Cb-inCb;$ $X=|Cr*\cos(\text{inAngle})+Cb*\sin(\text{inAngle})|;$ $Y=|-Cr*\sin(\text{inAngle})+Cb*\cos(\text{inAngle})|;$ If (X>maxAbsDevRadial):
  maxAbsDevRadial=X;
If (Y>maxAbsDevTangential):
  maxAbsDevTangentialu=Y;

hue_in_wid=6*maxAbsDevTangential;

sat_in_wid=6*maxAbsDevRadial;

If the user has not specified a particular chroma region or particular shape for a chroma region, it may next be determined whether a wedge-shaped chroma region better fits the range of chromas received. Such determination may be based on comparing a threshold saturation value to a saturation of the chroma furthest away from the determined center point of the ellipsoid [inCb, inCr] or [inSat, inAngle]. This saturation may be determined by application of an algorithm, as represented by the following of the following pseudocode:

$Cr\text{Extreme}=inCr+\text{maxAbsDevRadial}*\cos(\text{inAngle});$ $Cb\text{Extreme}=inCb+\text{maxAbsDevRadial}*\sin(\text{inAngle});$ SatExtreme=square root(CrExtreme*CrExtreme+ CbExtreme*CbExtreme);

If (SatExtreme>100), a wedge-shaped chroma region may be determined that fits all of the received chromas. After determining the center point of the wedge-shaped chroma region as described above, the next step may be to determine the chroma region parameters hue_wid_in and sat_min_in of the wedge-shaped chroma region. An algorithm, as represented by the following pseudocode, may be applied to determine hue_wid_in and sat_min_in:

Set maxDevRadial=0, maxAngularDiff=0;
For each input point as Cr,Cb:

theta=arctangent(Cb/Cr);

$Cr=Cr-inCr;$ $Cb=Cb-inCb;$ $X=|Cr*\cos(\text{inAngle})+Cb*\sin(\text{inAngle})|;$ If (X>maxDevRadial):
  maxDevRadial=X;

angularDiff=|theta−inAngle|;

if (angularDiff>maxAngularDiff):
  maxAngularDiff=angularDiff;
if (maxAngularDiff>PI/2):
maxAngularDiff PI/2;

hue_in_wid=2.2*maxAngularDiff;

If (maxDevRadial>inSat):
sat_min_in=0;
Else:

$Cr\text{Extreme}=inCr-\text{maxDevRadial}*\cos(\text{inAngle});$ $Cb\text{Extreme}=inCb-\text{maxDevRadial}*\sin(\text{inAngle});$ sat_min_in=square root(CrExtreme*CrExtreme+ CbExtreme*CbExtreme);

Center-moving eyedropper control 64 may be applied to shift the location of a center point of a chroma region. After selecting a chroma region, a user may click on the center-moving eyedropper control 64 at which point the user's cursor may become an eyedropper. The user may then move the eyedropper over a chroma from an image, a chroma palette or other chroma source, and the center point of the selected chroma region may be moved to the chroma selected with the eyedropper.

Include eyedropper 68 may be used to change a chroma region to include a chroma. After selecting an chroma region, a user may then click on the include eyedropper 68 at which point the cursor may become an eyedropper. The user may then move the eyedropper over a pixel of an image, a chroma from a chroma palette or other chroma source, and the selected chroma region may be adjusted to include the chroma selected with the eyedropper.

For example, FIGS. 10*a* and 10*b* illustrate the affect of applying the include eyedropper 68 to a chroma region 142, having a center point 143, a hue width 145, a minimum hue 148, and a maximum hue 149. Chroma region 142 is defined by a center point 143, a minimum saturation 147, a hue width 145, a hue minimum 148, and a hue maximum 149 if the user selects a chroma 146 with the excluding eyedropper 66, then the chroma region 142 may have to be changed to the chroma region 142' of FIG. 6*b* to include chroma 146. Specifically, the minimum hue 148 has been changed to minimum hue 148', maximum hue 149 has been changed to 149', and centerpoint 143 has been changed to centerpoint 143'.

Exclude eyedropper 66 may be used to exclude a chroma from an chroma region. After selecting an chroma region, a user may then click on the exclude eyedropper 66 at which point the cursor may become an eyedropper. The user may then move the eyedropper over a pixel of an image, a chroma from a chroma palette or other chroma source, and the selected chroma region may be adjusted to exclude the chroma selected with the eyedropper.

For example, FIGS. 11a and 11b illustrate the affect of applying the exclude eyedropper 66 to a chroma region. Chroma region 152 is defined by a center point 153, a saturation width 155, and a hue width 156. If the user selects a chroma 154 with the excluding eyedropper 66, then the chroma region 152 will have to be changed to the chroma region 152' of FIG. 11b to exclude chroma 154. Specifically, the saturation width 155 has been changed to saturation width 155', the hue width 156 has been changed to the hue width 156' and the centerpoint 153 has been changed to centerpoint 153'.

For a wedge-shaped chroma region, to expand a chroma region in accordance with the selection of the expand eyedropper, an algorithm, as described by the following pseudocode, may be applied.

angularDiff=|pAngle−inAngle|+0.1;

pSat=pSat−0.1;

if (pSat<sat_min_in):
sat_min_in=pSat;

angularChange=hue_wid_in/2−angularDiff;

if (angularChange<0):

hue_wid_in=hue_wid_in+angularChange;

inAngle=inAngle+angularChange/2;

outAngle=outAngle+angularChange/2;

Based on the new inAngle and outAngle, inCr,inCb, outCr,outCb may be recalculated and then converted to HSL for hue_in, sat_in, hue_out, sat_out, as follows.

inCr=inSat*cos (inAngle);

inCb=inSat*sin (inAngle);

outCr=outSat*cos (outAngle);

outCb=outSat*sin (outAngle);

For a wedge-shaped chroma region, to change the chroma region to exclude a chroma, by changing either its hue_with_in or sat_min_in, we may determine and then choose the smaller overall change to the chroma region's area by applying an algorithm, as described by the following pseudocode.

angularDiff=|pAngle−inAngle|;

areaSat=square root (pSat*pSat−
    sat_min_in*sat_min_in)*hue_wid_in/2;

areaHue=square root(128*128−
    sat_min_in*sat_min_in)*angularChange/2;

If (areaHue<areaSat):

hue_wid_in=hue_wid_in−angularChange;

inAngle=inAngle−angularChange/2;

outAngle=outAngle−angularChange/2;

Based on the new inAngle and outAngle, inCr,inCb, outCr,outCb may be recalculated and then converted to HSL for hue_in, sat_in, hue_out, sat_out as follows.

inCr=inSat*cos (inAngle);

inCb=inSat*sin (inAngle);

outCr=outSat*cos (outAngle);

outCb=outSat*sin (outAngle);

Else:

sat_min_in=pSat+0.1;

For an ellipsoid chroma region, to expand the chroma region to include a chroma, an algorithm, as described by the following pseudocode may be applied.
a=half the length of the major axis;
b=half the length of the minor axis;

angularDisplacement=|pAngle−inAngle|;

deltaHue=pSat*sin (angularDisplacement);

if (deltaHue is 0.0):

deltaSat=pSat−inSat;

else:

deltaSat=square root of (((Cr−inCr)*(Cr−inCr)+(Cb−
    inCb)*(Cb−inCb))−deltaHue*deltaHue);

if (pSat<inSat):
deltaSat=−deltaSat;
The ellipsoid chroma region may then be expanded to enclose the chroma as follows.
    if the ellipse is oriented radially:

absDeltaHue=|deltaHue|−b;

absDeltaSat=|deltaSat|−a;
else:

absDeltaHue=|deltaHue|−a;

absDeltaSat=|deltaSat|−b;

delta=MAX(absDeltaHue, absDeltaSat);

The major and minor axes may both be expanded by half the amount necessary. Later, the center of the ellipse may be shifted to cover the rest of the distance.

absDeltaHue=absDeltaHue/2;

absDeltaSat=absDeltaSat/2;

if the ellipse is oriented radially:

a=a+absDeltaSat;

b=b+absDeltaHue;

else:

a=a+absDeltaHue;

b=b+absDeltaSat;

Sat_in and sat_out may then be moved a distance of delta in the same direction as follows.
    if pSat<=inSat:

inSat=inSat−absDeltaSat;

inCr=inSat*cos (inAngle);

inCb=inSat*sin (inAngle);

outSat=outSat−absDeltaSat;

outCr=outSat*cos (outAngle);

outCb=outSat*sin (outAngle);

else:

inSat=inSat+absDeltaSat;

inCr=inSat*cos (inAngle);

inCb=inSat*sin (inAngle);

outSat=outSat+absDeltaSat;

outCr=outSat*cos (outAngle);

outCb=outSat*sin (outAngle);

Hue_in and hue_out may then be moved in the same direction by an angle that corresponds to shifting the center point of the ellipse by delta in arclength as follows.

angularChange=absDeltaHue/inSat;

inAngle=inAngle+angularChange;

outAngle=outAngle+angularChange;

Based on the new inAngle and outAngle, inCr,inCb, outCr,outCb may be recalculated and then converted to HSL for hue_in, sat_in, hue_out, sat_out.

inCr=inSat*cos (inAngle);

inCb=inSat*sin (inAngle);

outCr=outSat*cos (outAngle);

outCb=outSat*sin (outAngle);

For an ellipsoid chroma region, to change the chroma region to include a chroma, an algorithm as described by the following pseudocode, may be applied.

a=half the length of the major axis;
b=half the length of the minor axis;

angularDisplacement=|pAngle−inAngle|;

deltaHue=pSat*sin (angularDisplacement);

if (deltaHue is 0.0):

deltaSat=inSat−pSat;

else:

deltaSat=square root of (deltaHue*deltaHue−((Cr−inCr)*(Cr−inCr)+(Cb−inCb)*(Cb−inCb)));

if (pSat>inSat):
    deltaSat=−deltaSat;

The ellipse may then be shrunk to exclude the chroma if the ellipse is oriented radially then do the following:

absDeltaHue=b−|deltaHue|;

absDeltaSat=a−|deltaSat|;

deltaA=absDeltaSat;

deltaB=absDeltaHue;

else:

absDeltaHue=a−deltaHue|;

absDeltaSat=b−|deltaSat|;

deltaA=absDeltaHue;

deltaB=absDeltaSat;

The chroma may then be excluded from the ellipsoid by changing either the length of the ellipsoid's major axis or the ellipsoid's minor axis. Whatever change makes the smaller overall change to the ellipse's area may be selected as follows:

If (deltaA*b<=deltaB*a):
    If the ellipse is oriented radially:
        absDeltaHue=0;
    Else:
        absDeltaSat=0;
else:
    If the ellipse is oriented radially:
        absDeltaSat=0;
    Else:
        absDeltaHue=0;

Both the major and minor axes may then be shrunk by half the amount necessary. Later the center of the ellipse may be shifted to cover the rest of the distance as follows.

absDeltaHue=absDeltaHue/2;

absDeltaSat=absDeltaSat/2;

if the ellipse is oriented radially:

a=a−absDeltaSat;

b=b−absDeltaHue;

else:

a=a−absDeltaHue;

b=b−absDeltaSat;

Sat_in and sat_out may be moved by distance delta, in the same direction as follows:

if pSat<=inSat:

inSat=inSat+absDeltaSat;

inCr=inSat*cos (inAngle);

inCb=inSat*sin (inAngle);

outSat=outSat+absDeltaSat;

outCr=outSat*cos (outAngle);

outCb=outSat*sin (outAngle);

else:

inSat=inSat−absDeltaSat;

inCr=inSat*cos (inAngle);

inCb=inSat*sin (inAngle);

outSat=outSat−absDeltaSat;

outCr=outSat*cos (outAngle);

outCb=outSat*sin (outAngle);

We need to move hue_in and hue_out in the same direction, by an angle which corresponds to shifting the center point of the ellipse by delta in arclength.

angularChange=absDeltaHue/inSat inAngle=inAngle−angularChange outAngle=outAngle−angularChange Based on the new inAngle and outAngle, we recalculate inCr,inCb,outCr,outCb which are then converted to HSL for hue_in, sat_in, hue_out, sat_out.

$$\text{in}Cr = \text{inSat} * \cos(\text{inAngle})$$

$$\text{in}Cb = \text{inSat} * \sin(\text{inAngle})$$

$$\text{out}Cr = \text{outSat} * \cos(\text{outAngle})$$

$$\text{out}Cb = \text{outSat} * \sin(\text{outAngle})$$

Having now described a user interface that allows user to define chroma regions and chroma modifications for modifying chromas of the chroma regions, determining output chromas based on the chroma regions and modifications will now be described in more detail.

Figure 12:
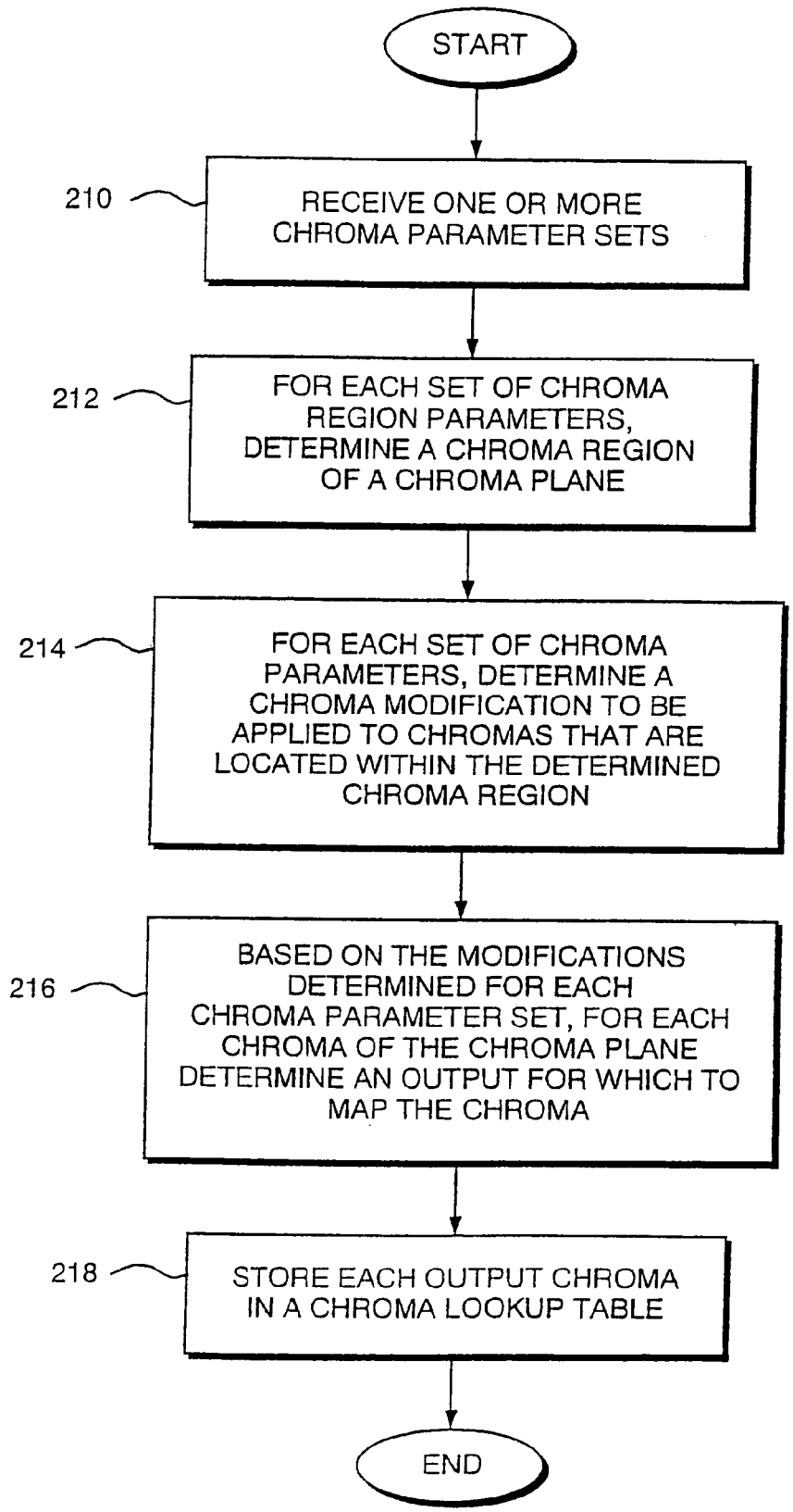
FIG. 12 is a flowchart illustrating an example embodiment of determining output chromas from one or more chroma parameter sets.

FIG. 12 is a flow chart illustrating an example embodiment of a method of determining output chromas for one or more sets of chroma parameters. As used herein, a "set of chroma parameters" or a "chroma parameter set" refers to a set of chroma region parameters and its corresponding set of chroma modification parameters.

In step 210, one or more chroma parameter sets may be received. In step 212, for each chroma parameter set, a chroma region of a chroma plane may be determined. For example, the chroma plane may be an HSL chroma plane, an RGB chroma plane, or a YCbCr chroma plane. Further, the chroma parameter set may represent the chroma region in a chroma plane (i.e., color space) different from the chroma plane for which output chromas are to be determined. For example, if a chroma parameter set is defined in an HSL chroma plane, the saturation and hue values may be converted to Cr and Cb values of a YCbCr chroma plane.

To convert hue and saturation values from HSL to Cr and Cb values in YCbCr coordinates, a conversion may first be made from HSL coordinates to RGB coordinates using a known algorithm. For a more detailed description of converting between RGB space and HSL color space, see Foley, pages 592-595.

Further, if a chroma parameter set represents chroma in RGB space such as, for example, a red value, a green value and a blue value, then the chroma parameters of the chroma parameter set may be converted from RGB color space to a chroma plane of YCbCr color using Equations 1-3 above.

Thus, the chroma parameters may all be converted to YCbCr space to form the following YCbCr chroma parameters: hue_in (center point saturation), hue_wid_in (hue width), sat_in (center point saturation), lightness_in (center point lightness), soft_in (softness parameter), hue_out (hue modification), sat_out (saturation modification), lightness_out (modification lightness) and sat_min_in (minimum saturation for a wedge-shape) or sat_wid_in (saturation width for an ellipse). Further, YCbCr Euclidean chroma region parameters [inCr,inCb] and [outCr,outCb] corresponding to hue_in, sat_in and hue_out, sat_out may also be determined.

The equation defining the hue of any chroma [Cr,Cb] in CbCr space may be defined as $$Sat_i = \sqrt{(Cr)^2 + (Cb)^2};$$ Equation 7:

And the hue of any chroma in CbCr space may be defined as:

Equation 8: $Hue_i = \tan^{-1}\left(\dfrac{Cb}{Cr}\right)$

Further, chroma region parameters minAngle (the minimum hue of the chroma region), inAngle (the center point hue), and maxAngle (the maximum hue), may all be determined, all of which range may range from [0,2PI], or [0,360°]. It may be enforced that 0<=minAngle<maxAngle<=2PI. Also, the width of the wedge may be enforced to be <PI (i.e. 180 degrees). The wedge may be defined by an area that extends clockwise from minAngle to maxAngle, or an area that extends counterclockwise from minAngle to maxAngle, whichever of these areas is determined to be less than PI.

If a chroma region is an ellipsoid, hue_wid_in may be referred to as the angular width of the ellipsoid, and sat_wid_in may be referred to as the radial width of the ellipsoid. If sat_wid_in is greater than or equal to hue_wid_in, the ellipse is oriented radially, and otherwise the ellipse is oriented tangentially. If the ellipse is oriented radially, the length of the major axis (2a) of the ellipse is sat_wid_in and the length of the minor axis (2b) is hue_wid_in. In contrast, if the ellipse is oriented tangentially, then the length of the major axis (2a) is hue_wid_in and the length of the minor axis (2b) is sat_wid_in.

A first focus of the ellipse chroma region may be located along the major axis of the ellipse at a distance from the center point of the ellipse defined by:

$$f1 = sat\_in + \sqrt{a^2 - b^2}.$$ Equation 9:

A second focus of the ellipse chroma region may be located along the major axis of the ellipse at a distance from the center point of the ellipse defined by:

$$f2 = sat\_in_C - \sqrt{a^2 - b^2}.$$ Equation 10:

Returning to FIG. 10, in step 214, for each chroma parameter set, a chroma modification may be determined that is to be applied to chromas that are located within the determined chroma region. Such determination may depend on the shape of the chroma region such as, for example, an ellipsoid or a wedge. Some calculations for implementing a chroma modification may be precalculated before the actual modification is made to a chroma.

A modification for a given chroma [Cr, Cb] determined to be located within a chroma region essentially involves rotating [Cr, Cb] a distance hue_out_hue_in, and then offsetting [Cr, Cb] a distance sat_out_sat_in. If the chroma modification to be applied corresponds to a wedge-shaped chroma region, and the chroma modification specifies a reduction in hue, [Cr, Cb] may be scaled, as opposed to offset, to sat_in. Scaling a chroma value is described in more detail in U.S. patent application Ser. No. 09/054,835, entitled "Method and Apparatus for Color Manipulation" by Robert Gonsalves, filed Apr. 4, 1998, the contents of which are herein incorporated by reference. Further, a softness factor (Softness Factor) may also be applied to a chroma, depending on whether a chroma is located within a softness region, as described in more detail below.

For chromas that are located within a chroma region, a color modification may be defined by the following equations:

$$Cr\text{Output} = \text{SoftnessFactor} * Cr\text{New} + (1 - \text{SoftnessFactor}) * Cr;$$ Equation 11:

$$Cb\text{Output} = \text{SoftnessFactor} * Cb\text{New} + (1 - \text{SoftnessFactor}) * Cb;$$ Equation 12:

where CrNew and CbNew are defined by:

$$Cr\text{New} = Cr * k * \cos(\text{theta}) - Cb * k * \sin(\text{theta}) + Cr\text{diff};$$
and Equation 13:

$$Cb\text{New} = Cr * k * \sin(\text{theta}) + Cb * k * \cos(\text{theta}) + Cb\text{diff};$$ Equation 14:

where k is a scaling factor, and theta is the difference between outAngle and inAngle (i.e., theta=outAngle-inAngle), and the other variables are defined as follows.

Chroma [Cr, Cb] is first rotated as defined by:

$$CrAligned = Cr^* \cos(\theta) - Cb^* \sin(\theta); \quad \text{Equation 15:}$$

$$CbAligned = Cr^* \sin(\theta) + Cb^* \cos(\theta); \text{ and} \quad \text{Equation 16:}$$

$$AlignedSat = \text{square root}(CrAligned^*CrAligned + CbAligned^*CbAligned); \quad \text{Equation 17:}$$

If the chroma region has an ellipsoid shape, or if the chroma region is a wedge shape and the chroma modification defines a saturation increase, then a radial offset may be applied, where: k=1, Crdiff=outCr−alignedCr, and Cbdiff=outCb−alignedCb.

If the chroma region has a wedge shape and the chroma modification defines a saturation increase, or if the chroma region has an ellipsoid shape and an invert operation is being performed (described in more detail below in connection to FIG. 15), then a radial scaling may applied, where: k=outSat/alignedSat, deltaCr=0, deltaCb=0.

A softness parameter (soft_in) may be defined to be a percentage of arc length of a chroma region having a half-width of 30 degrees at 50% saturation. Thus, the softness parameter, and hence the width of a softness region, remain constant, regardless of the width of chroma region, as shown in FIG. 5. The softness parameter may be used to determine a softness factor which allows a gradual transition between chromas modified by a chroma modification (i.e., chromas within the chroma region) and chromas not within the chroma region and, consequently, not modified.

For example, for a wedge-shaped chroma region having a positive softness, a softness region corresponding to a chroma region may be a region between an outer wedge and an inner wedge of the chroma region. Chromas within the inner wedge may have a softness factor of 1.0. Chromas outside of the outer wedge may have a softness factor of 0.0. Chromas between the two wedges may have a softness factor which may be determined as follows. A given chroma may defined as [Cr,Cb] as well as [pSat, pAngle]. It may be determined how far (in arclength) the given chroma lies from the nearest side of the wedge by the following equation:

$$d1 = pSat^* \text{the minimum of } |pAngle-minAngle| \text{ and } |pAngle-maxAngle|. \quad \text{Equation 18:}$$

It may be determined how far the chroma lies from the base of the wedge by the following equation:

$$d2 = pSat - sat\_min\_in. \quad \text{Equation 19:}$$

The SoftnessFactor for a wedge-shaped chroma region may then be determined as a minimum of d1 and d2, divided by the softness parameter.

For ellipsoid chroma regions, SoftnessFactor may be determined as the distance of the chroma from the edge of the ellipse, divided by the softness parameter and clamped between 0 and 1.

Returning to FIG. 12, in step 216, based on the chroma modifications determined for each chroma parameter set, for each chroma of the chroma plane, an output chroma may be determined for which to map the chroma.

Figure 13A:
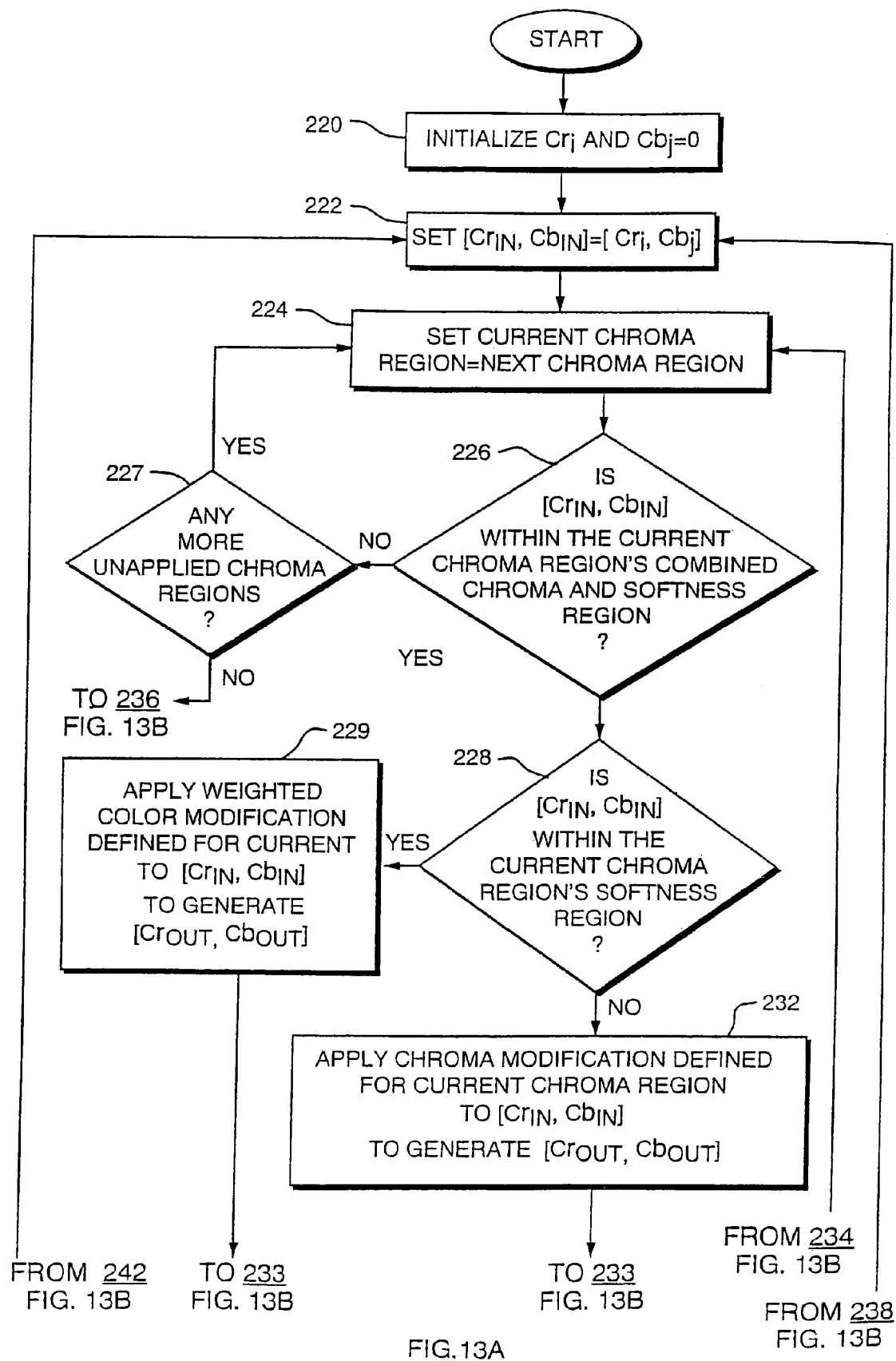
FIG. 13 is a flowchart illustrating an example embodiment of determining output chromas based on modifications determined from a chroma parameter set.
Figure 13B:
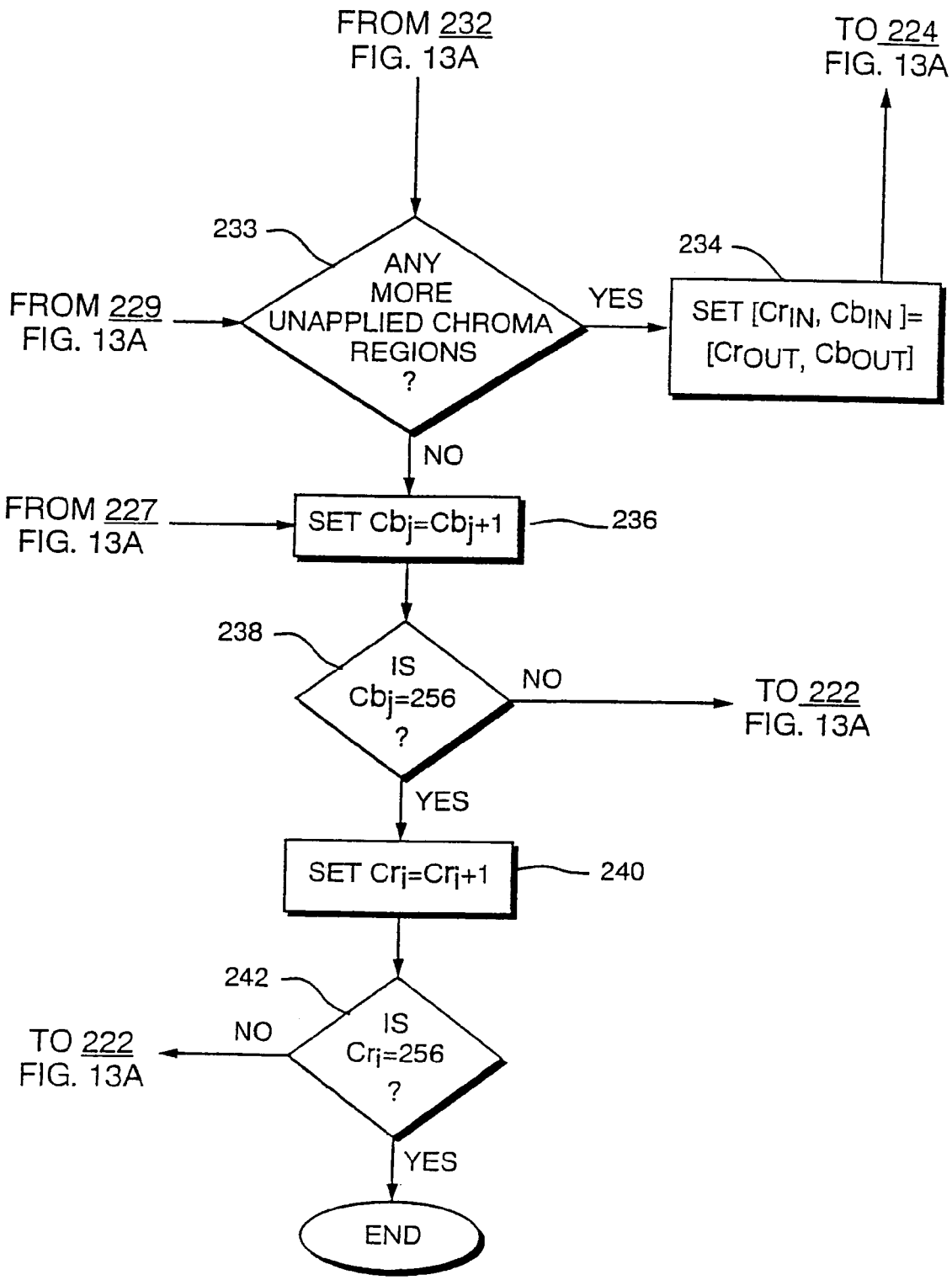

FIG. 13 is a flow chart illustrating an example embodiment of step 216 of FIG. 10. In step 220, and an incremental Cr value, $Cr_i$, an incremental Cb value, $Cb_j$, may be initialized to 0. In a next step 222, an input chroma, $[Cr_{IN}, Cb_{IN}]$ may be set equal to $[Cr_i, Cb_j]$.

Next, in step 224, a current chroma region may be set equal to a next chroma region. For a first pass through steps 224-242, step 224 effectively initializes a current chroma region to a first chroma region.

Next, in step 226, it may be determined whether $[Cr_{IN}, Cb_{IN}]$ is within the current chroma region's combined chroma and softness region. If it is determined that this input chroma is within the current chroma region's combined chroma and softness region, then in step 228, it is determined whether the input chroma is within the current chroma region's softness region.

A chroma may be determined to be within a wedge-shaped chroma region if a distance from the origin to the chroma (i.e., $Sat_i$) is greater than or equal to sat_min_in, and the angle (i.e., $Hue_i$) is located between minAngle and maxAngle.

A chroma may be determined to be within a wedge-shaped chroma region if the sum of the distances from the chroma to the foci (i.e., $f_1$ and $f_2$) of the ellipse is less than or equal to the length of the major axis of the ellipse.

If a positive softness parameter has been entered, then the softness region may expand the angles and distance that a chroma may be located within. If a negative softness parameter has been entered, then the softness region may decrease the angles and distance that a chroma may be located within. As described above, the softness factor may be a function of the arc distance between the input chroma and a boundary of the determined chroma region.

If it is determined in step 228 that the input chroma is within the current chroma region softness region, then in step 229, a chroma modification defined by the current chroma region and weighted by a softness factor may be applied to the input chroma to generate an intermediate output chroma, $[Cr_{OUT}, Cb_{OUT}]$.

If it is determined in step 228 that the input chroma is not within the current chroma region's softness region, then the chroma region implicitly is within the determined chroma region for the current chroma region. Consequently, in step 232, the chroma modification defined by the current chroma region is applied to the input chroma to generate the output chroma.

In step 233, it may be determined whether there are any more unapplied chroma regions. This may be determined by reviewing a chroma region list to determine if any chroma regions remain. If it is determined in step 233 that there are more unapplied chroma regions, then the input chroma may be set equal to the output chroma in step 234 and the current chroma region is set equal to the next chroma region in step 224. The input chroma may be set equal to the intermediate output chroma because as discussed above, in an embodiment of applying secondary chroma modification, where more than one input/output chroma region is defined, the input/output chroma regions may be applied sequentially. If chroma parameter sets are applied sequentially, the chroma modification defined for a chroma parameter set may be applied to the output chromas resulting from applying the previous chroma parameter set.

For example, if a first chroma parameter set changed all green chromas to yellow chromas, and a second input/output chroma region changed all yellow chromas to blue chromas, then the result of applying the first and second chroma regions sequentially would be to change all green and yellow chromas to blue chromas. Specifically, after applying the first chroma parameter set, all greens would become yellow. Then, when the second chroma parameter set is applied, all of the original yellow and the yellow resulting from the application of the first chroma region would be changed to blue.

Returning to FIG. 13, if in step 226 it is determined that the input chroma is not within the current chroma region's combined chroma and softness region, then in step 227, it may be determined whether there are any more unapplied chroma regions. If it is determined in step 227 that there are more unapplied chroma regions, then next in step 224 the current chroma region is set equal to the next chroma region.

Significantly, in the case of step 227, it is not necessary to set the chroma region equal to the intermediate output chroma region because a chroma modification has not been applied to the chroma region. Accordingly, the output chroma for this input chroma may be equal to the input chroma itself. Further, the output chromas may all be predefined by default to be equal to the chroma itself. Therefore, any chromas of the chroma plane for which a chroma modification has not been defined (i.e., that do not fall within any of the determined chroma regions defined by the chroma parameter sets) may be unaffected.

If it is determined in step 227 or step 233 that there are no more unapplied chroma regions, then in step 236 the incremental Cb value may be incremented by one.

Next, in step 238, it may be determined whether the incremental Cb value=256 such that it exceeds a possible Cb value for the YCbCr chroma plane (offset by 128). If it is determined that the incremental Cb value does not exceed 256, then in step 222, the input chroma may be set to the new incremental chroma resulting from incrementing the incremental Cb value. If it is determined in step 238 that the incremental Cb value is equal to 256, then in step 240 the incremental Cr value may be incremented by one.

Next, in step 242, it may be determined whether the incremental Cr value is equal to 256 and thereby exceeds the maximum Cr value of 255. If it is determined in step 242 that the incremental Cr value is not equal to 256, then in step 222 the input chroma may be set equal to the new incremental chroma resulting from incrementing the incremental Cr chroma by one.

If it is determined in step 242 that the intermediate Cr value is equal to 256, then step 216 is finished. All of the incremental output values determined from steps 220-242 may then be loaded into the chroma LUT in step 218.

Figure 14A:
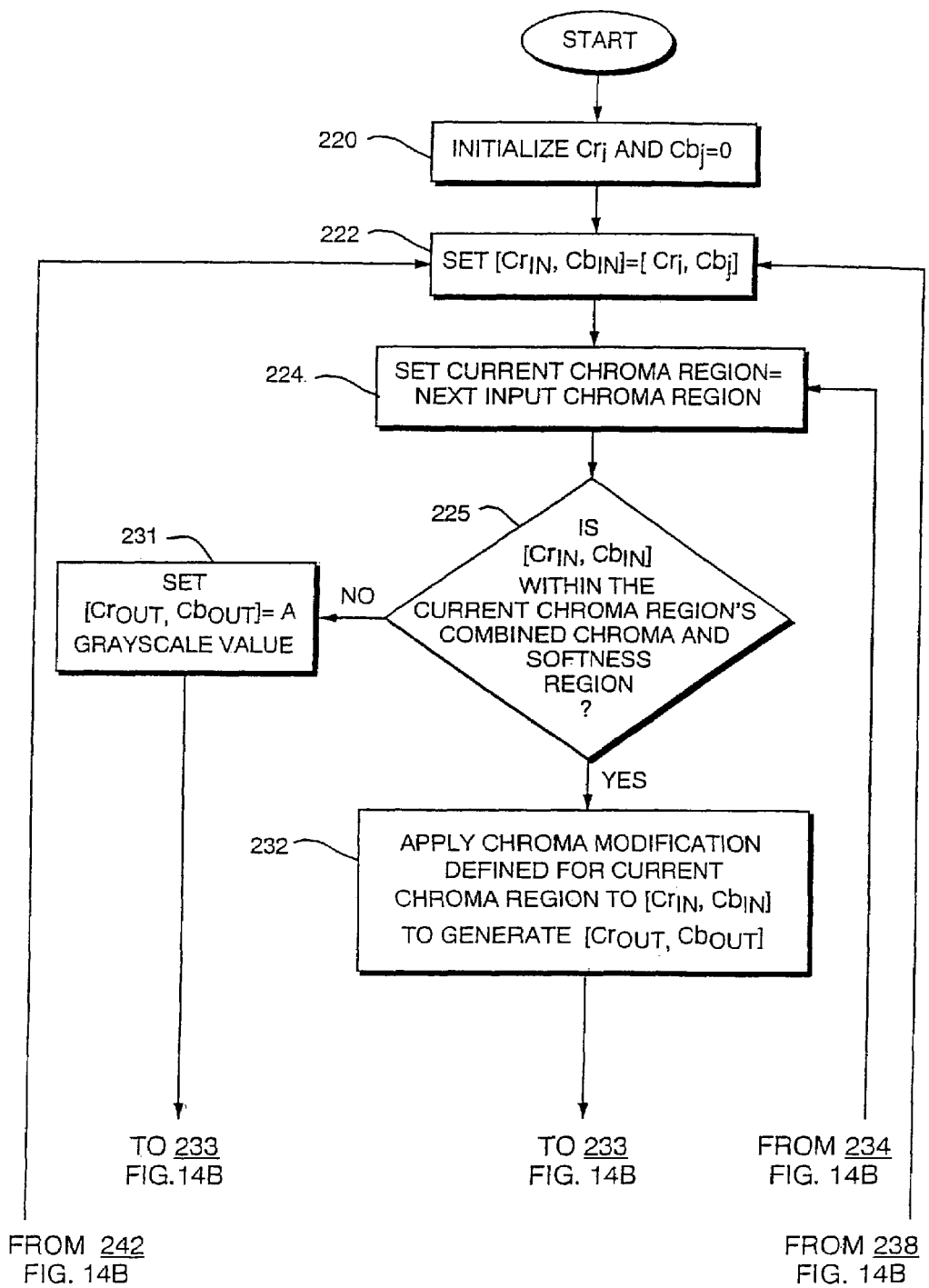
FIG. 14 is a flowchart illustrating an example embodiment of previewing one or more chroma modifications defined for one or more corresponding chroma regions.
Figure 14B:
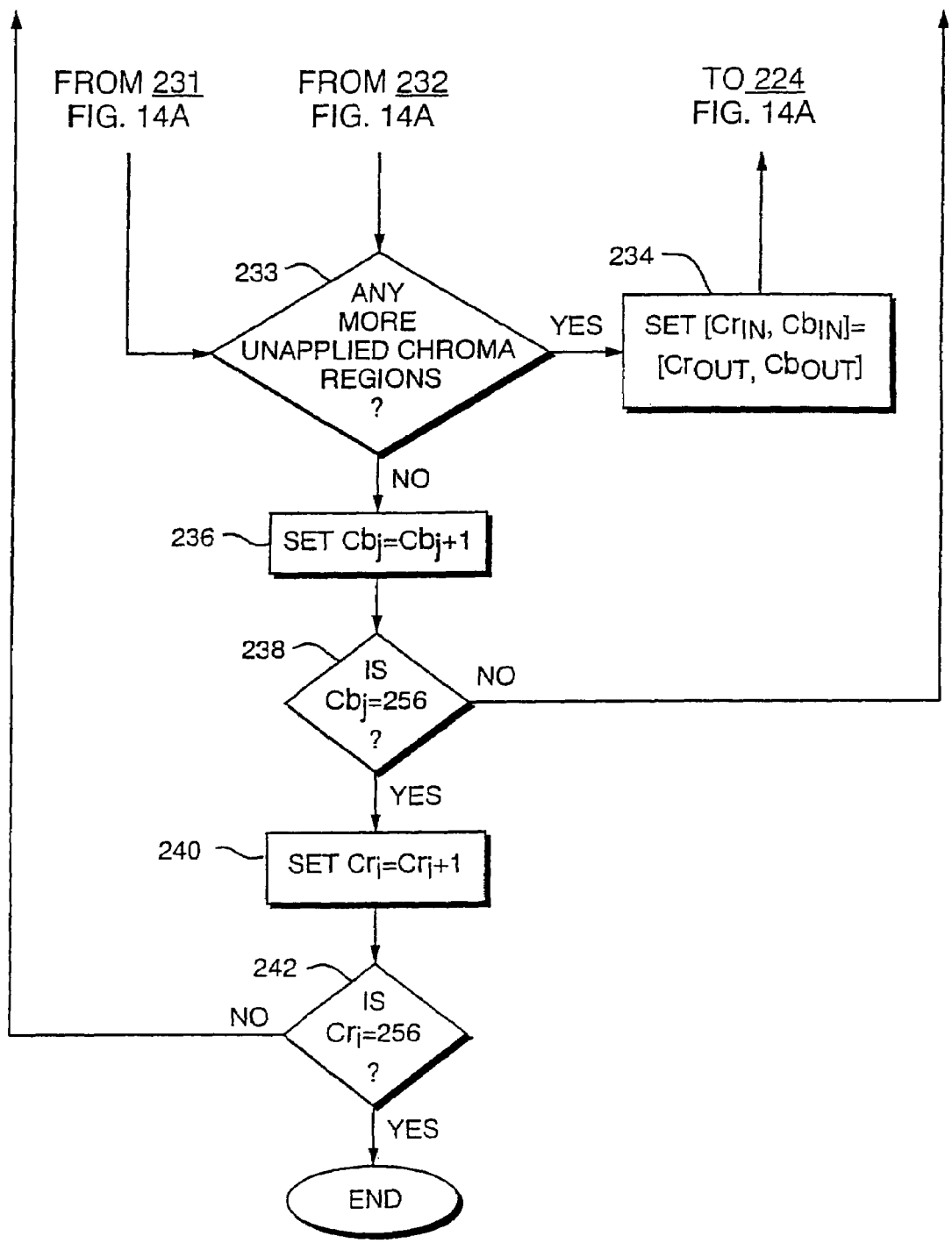

FIG. 14 is a flow chart illustrating an example embodiment of step 216 when the operation to be performed is a preview operation as described above. Any steps of FIGS. 14 and 15 that are the same as the steps of FIG. 13 are referenced with the same number and are not described again here.

In step 225, it may be determined whether the input chroma is within the current chroma region's combined chroma and softness region. An alternative embodiment, in step 225, it may be determined whether the input chroma is within the determined chroma region for the current chroma region, thereby not accounting for a softness region.

If it is determined in step 225 that the input chroma is not within the current chroma region's combined chroma and softness region (or alternatively not within the current chroma region) then in step 231 the intermediate output chroma corresponding to the input chroma may be set equal to a gray scale value. Setting the output chroma for all chromas that do not fall within the input chroma's region equal to a gray scale value may have the affect, when applied to a digital image, of showing all pixels that have a chroma unaffected by a chroma modification as gray scale values, and showing only the pixels that have a chroma affected by the chroma modifications in chroma.

If it is determined in step 225 that the input chroma is not located within the current chroma region's combined chroma and softness region (or alternatively that the input chroma is not within the current chroma region), then in step 232 the chroma modification defined by the current chroma region may be applied to the input chroma to generate an intermediate output chroma as described above in connection to FIG. 13.

Figure 15A:
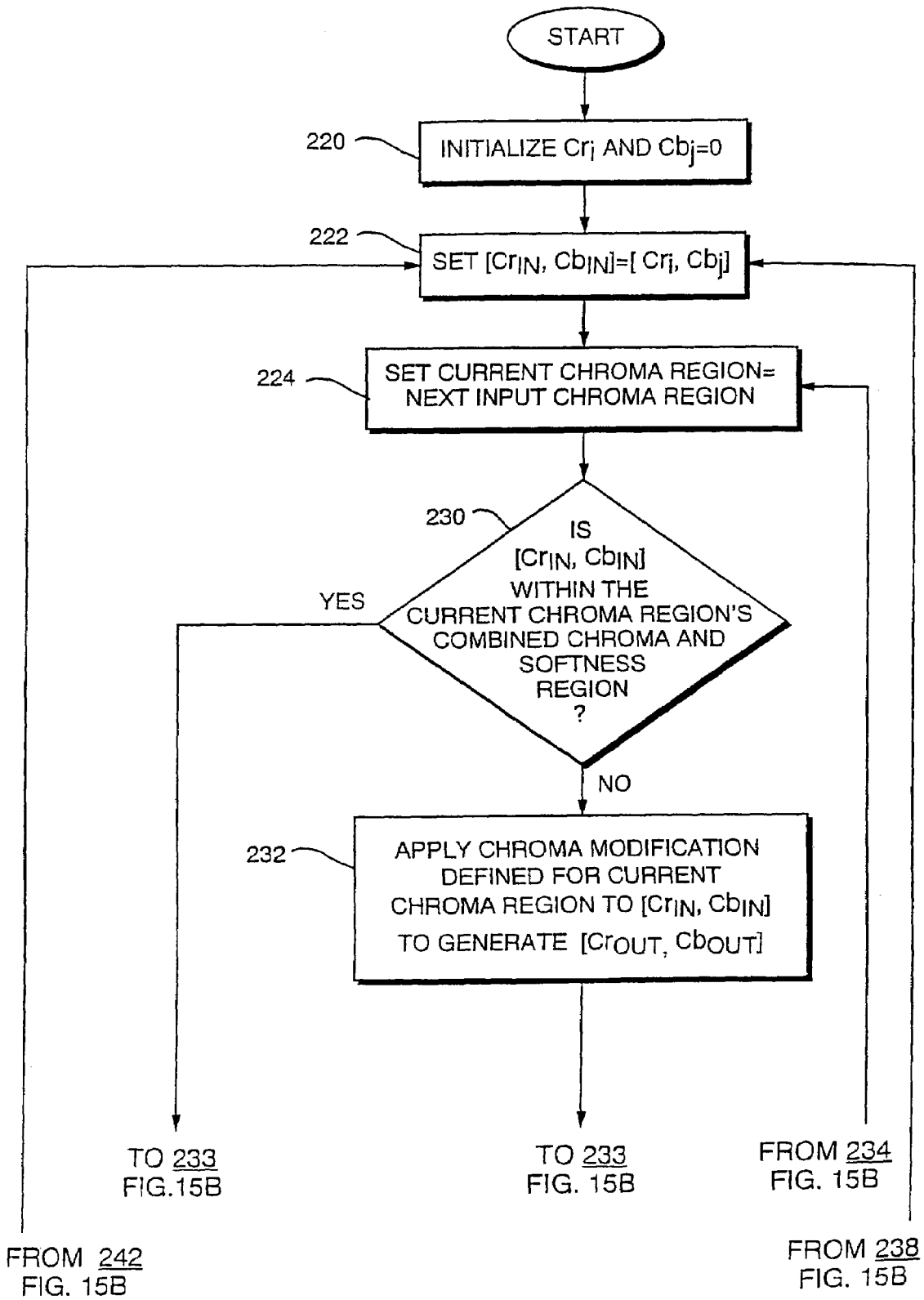
FIG. 15 is a flowchart illustrating an example embodiment of inverting a chroma modification defined for a chroma region.
Figure 15B:
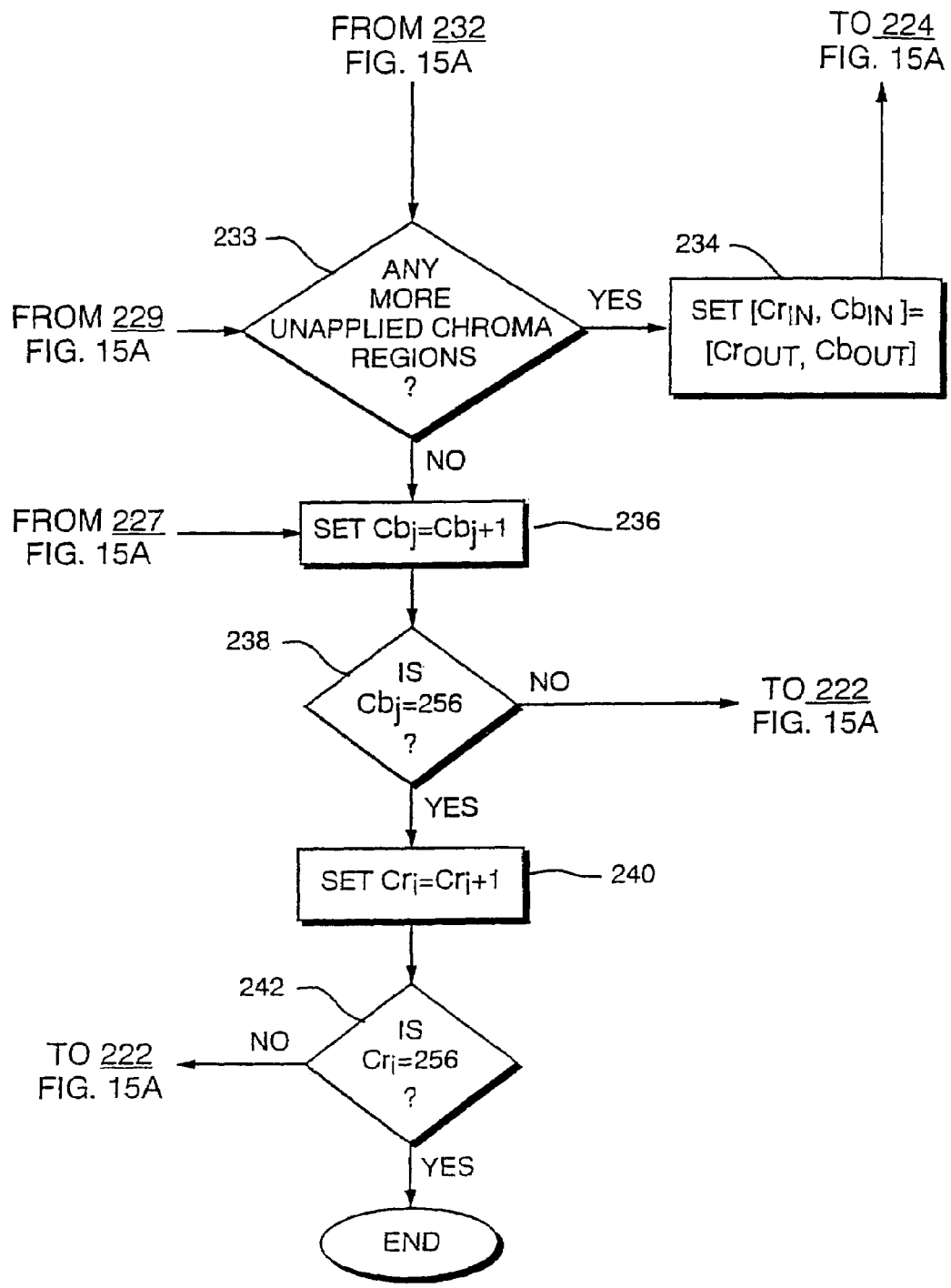

FIG. 15 is a flowchart illustrating an example embodiment of implementing the invert function described above in connection to FIG. 1. The flowchart of FIG. 15 is virtually the same as the flowchart of FIG. 14 except that the decision made in step 225 of FIG. 14 is reversed as indicated by step 230 of FIG. 15. Specifically, in step 230, if it is determined that the input chroma is outside (i.e., not within) the current chroma region's combined chroma and softness region (or alternatively within the current chroma region), then in step 232 the chroma modification defined by the current chroma region may be applied to the input chroma to generate the intermediate output chroma as described in connection to FIG. 13. Else, the process may proceed to step 233.

If it is determined in step 230 that the input chroma is within the current chroma region's combined chroma and softness region (or alternatively within the current chroma region), then the process may proceed to step 233, or alternatively, the intermediate output chroma corresponding to the input chroma may be set equal to a gray scale value.

As described above in connection to FIG. 1, when applying the invert functionality, steps 220-242 of FIG. 15 may be applied only to a single chroma region. When a chroma LUT (chroma LUT) resulting from applying steps 220-242 of FIG. 15 to a single chroma region is applied to a digital image, any pixels having a chroma located within the single chroma region may be unaffected. In contrast, each pixel of the digital image having a chroma located outside of the determined chroma region may have its chroma modified in accordance with the output chroma stored at the corresponding entry of the chroma LUT. For each pixel, this output chroma may result from the application of the single chroma modification.

Finally, in step 218, each output chroma may be stored in a chroma look up table. A chroma look up table may be a table in which each entry of the table corresponds to each possible value of a chroma plane. For example, if the chroma plane is a CbCr chroma plane, and both Cr and Cb may be defined by a value between 0 and 255 (i.e., −128--offset 128 offset by 128), then the chroma look up table should have 256×256=65,536, (i.e., 64K) entries. For a Cr or Cb output chroma to have a value between 0 and 255, each entry should be capable of storing 2 bytes (i.e., 16 bits) of data to represent the output chroma. Therefore, a chroma LUT may include 64K 2 byte entries, where each entry corresponds to a [Cr, Cb] value of a legal chroma of the YCbCr chroma plane, and each entry contains a [Cr, Cb] value of a legal chroma of the YCbCr chroma plane.

Figure 16A:
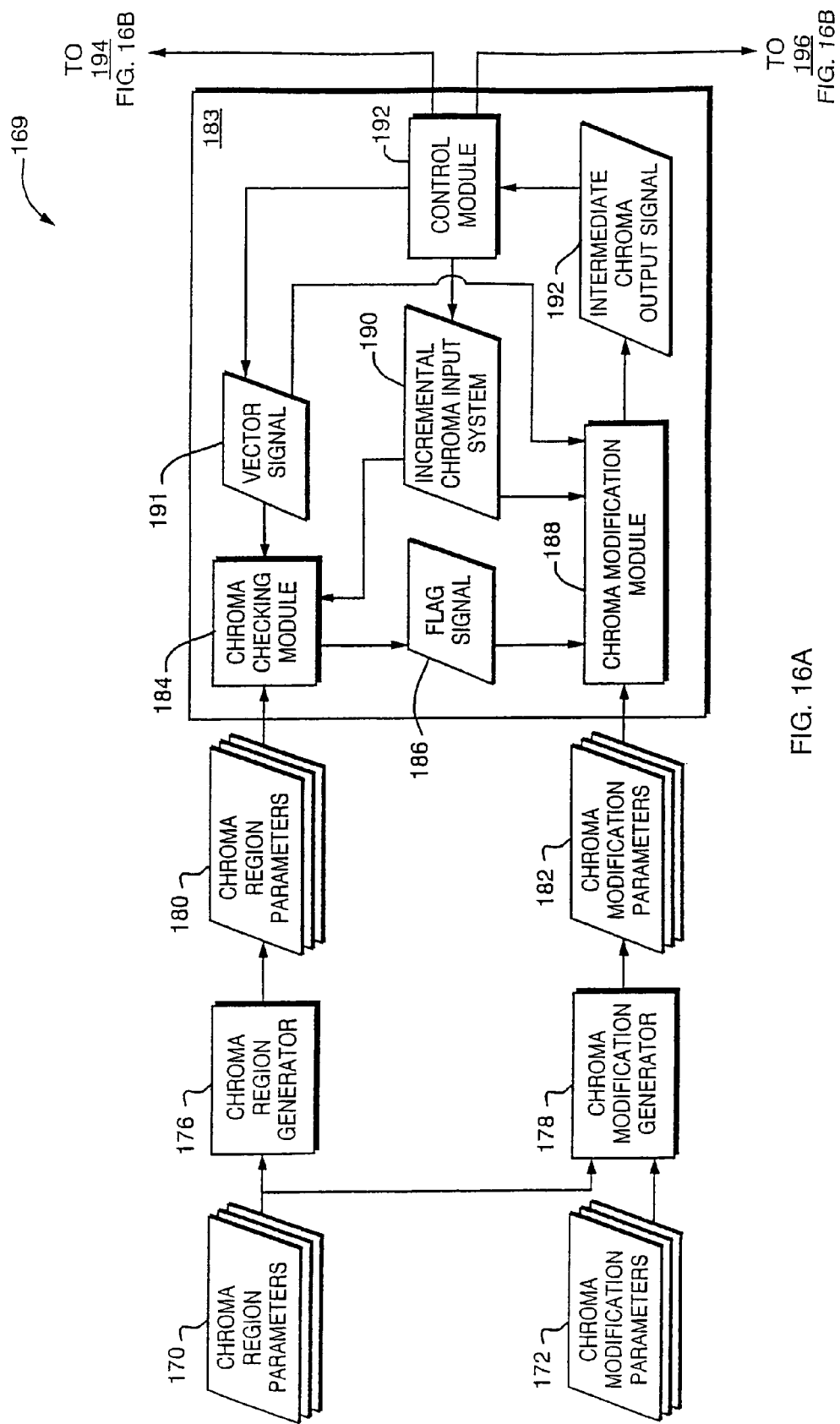
FIG. 16 is a data flow diagram illustrating an example embodiment of a system for determining output chroma from chroma parameters.
Figure 16B:
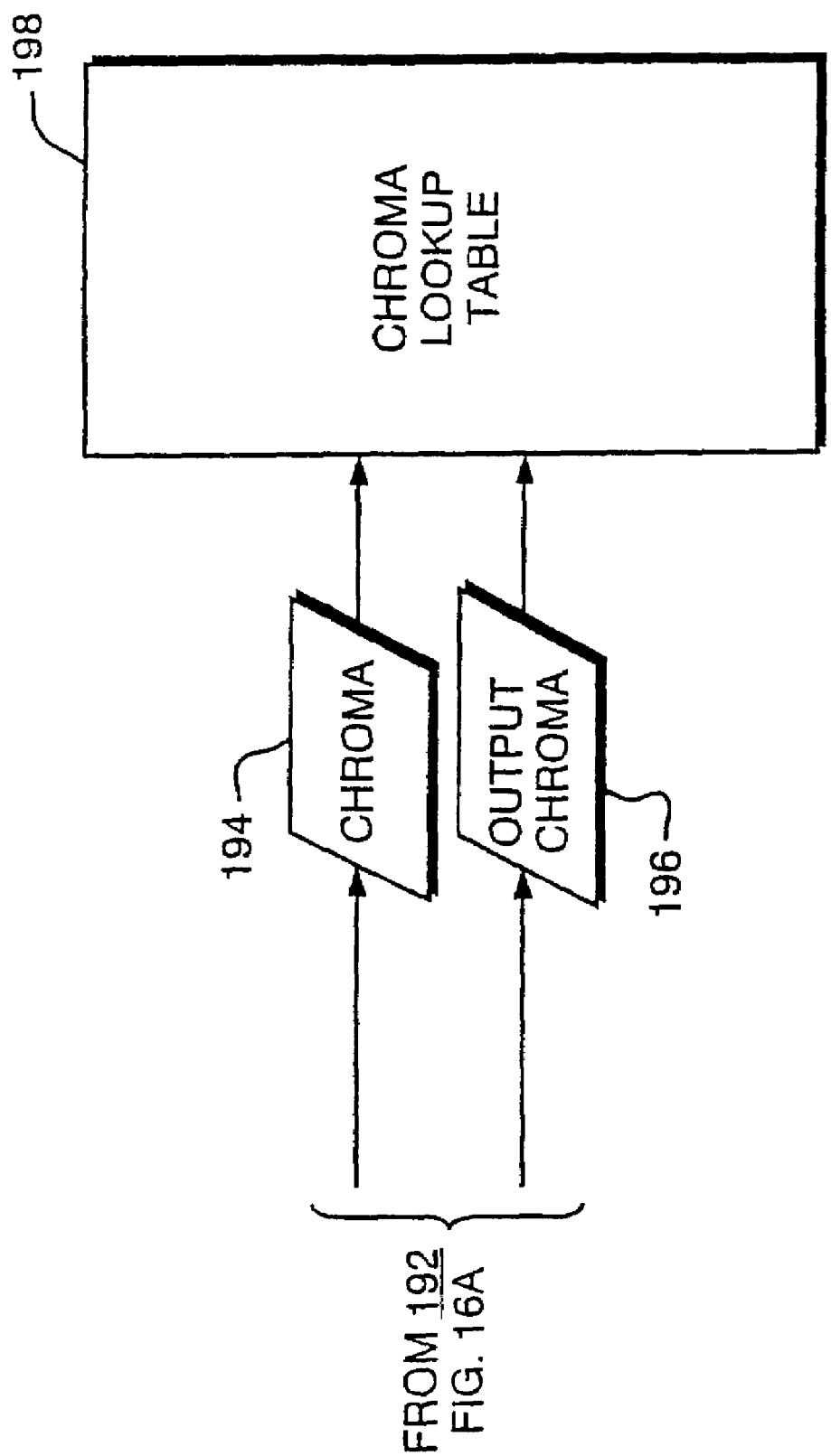

FIG. 16 is a data flow diagram illustrating an example embodiment of a system 169 for determining output chromas from chroma parameter sets. The system 169 may include a chroma region generator 176, a chroma modification generator 178, an output chroma generator 183 and a chroma LUT 198.

The chroma region generator 176 may receive one or more chroma regions 170 and generate as output one or more chroma regions 180. For each chroma region, the chroma region generator may determine a chroma region as described above in connection to step 212 of FIG. 12 and FIGS. 13-15. The chroma region generator 176 may include a chroma converter to convert a chroma from a first chroma plane to a chroma of a second chroma plane. For example, the chroma converter may convert a chroma in RGB space or HSL space to a chroma in the YCbCr chroma plane. Further, the chroma region generator may return values indicative of the determined chroma region to a user interface such as, for example, user interface 1 so that the user interface can represent the chroma region to a user.

For example, if a chroma region was defined by a plurality of chromas defined in RGB space, such as, for example, resulting from using the chroma match controls 60 and 62, the chroma region generator may generate a chroma region in YCbCr space, and then convert the YCbCr values that define the chroma region in YCbCr chroma plane to HSL values that the user interface may use to display the chroma region as a graphical chroma region or to provide text values for the chroma region textboxes.

The chroma modification generator 178 may receive a set of chroma region parameters 170 and a set of chroma modification parameter 172 that together form a chroma parameter set, and generate one or more chroma modifications 182 to be applied to chromas of the chroma region 180 corresponding to the chroma region parameters 170.

The chroma modification generator 176 may generate one or more chroma modifications 182 as described above in connection to step 214 of FIG. 12.

The output chroma generator 183 may receive one or more chroma regions 180 and one or more chroma modifications 182 and generate one or more chromas 194 and one or more output chromas 196, where each chroma 194 and output chroma 196 may form a chroma/output chroma pair. The output chroma generator may generate output chromas as described above in connection to step 216 of FIG. 10 and in connection to FIGS. 13-15.

The output chroma generator 183 may include a chroma checking module 184, a chroma modification module 188 and a control module 192. The chroma checking module 184 may receive one or more chroma regions 180, incremental chroma input signal 190 and a current chroma region signal 191, and generate a flag signal 186 that indicates whether the chroma identified by the incremental chroma input signal 190 falls within a chroma region 180 for the current chroma region indicated by the current chroma region signal 191. The chroma checking module 184 may determine whether a chroma is located within a chroma region as described above in connection to step 226 of FIG. 13.

The chroma modification module 188 may receive one or more chroma modifications 182, each chroma modification corresponding to a determined chroma region 180. Chroma modification module 188 may also receive the flag signal 186, the incremental chroma input signal 190, and the current chroma region signal 191. The chroma modification module may modify the chroma indicated by the incremental chroma input signal with a chroma modification 182 depending on whether the flag signal indicates that the chroma indicated by the incremental chroma input signal 190 is located within a chroma region 180. The chroma modification module 188 may modify the chroma as described above in connection to step 216 of FIG. 12 and FIGS. 13-15 above. For example, the chroma modification module may consider whether to chroma modify in accordance with a preview or an invert function, whether to offset values or scale values, and whether to apply a softness factor as described above.

Control module 192 may generate the current chroma region signal 191 to indicate to the chroma checking module 184 and the chroma modification module 188 the current chroma region. The control module 192 may also generate the incremental chroma input signal 190 to indicate the current input chroma being checked and possibly modified to the chroma checking module 184 and the chroma modification module 188. For example, the incremental chroma input signal 190 may indicate a $Cr_{IN}$ value and a $Cb_{IN}$ value.

The control module 192 may also receive the intermediate chroma output signal 192 and may determine whether to set the incremental chroma input signal equal to the intermediate chroma output signal 192 as described above in connection to FIGS. 13-15. Further, the control module 192 may be configured to control the outputting of a chroma 194 and corresponding output chroma 196 to a chroma LUT 198, after chroma checking, and possibly chroma modification, have been performed on an incremental chroma input signal for every chroma parameter set as described above in connection to step 218 of FIG. 12.

Figure 17:
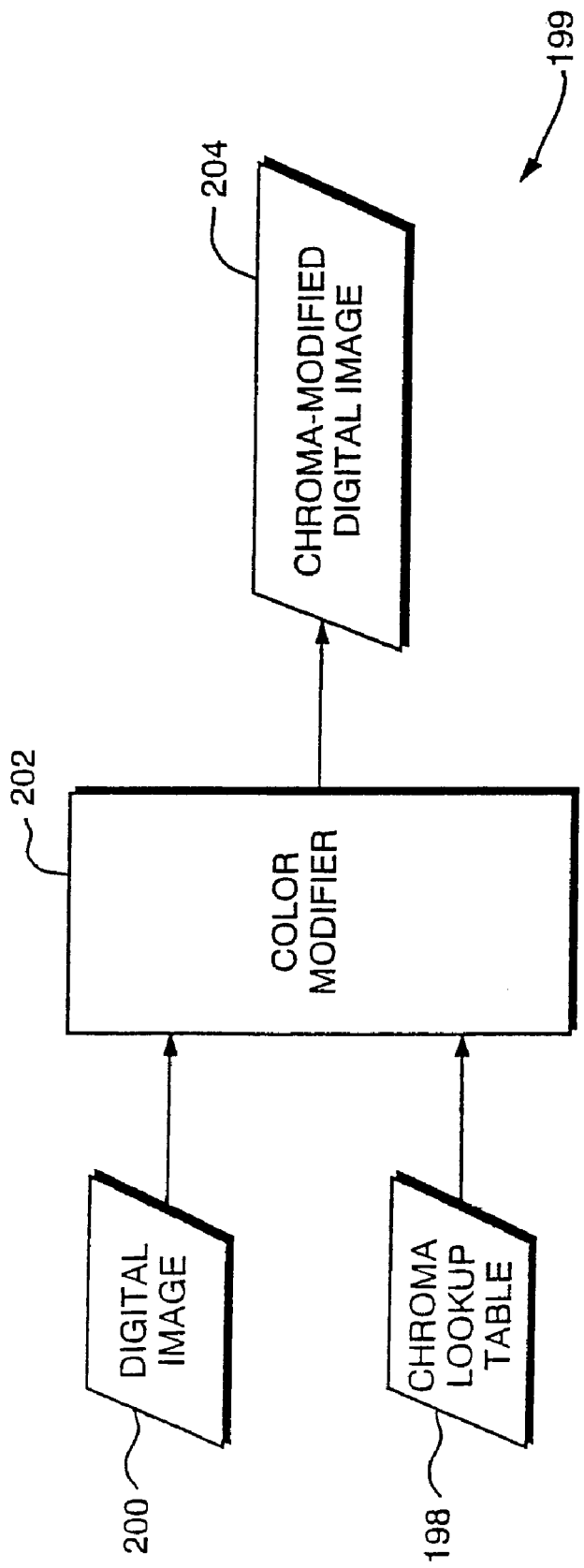
FIG. 17 is a data flow diagram illustrating an example embodiment of a system for modifying a digital image using a chroma lookup table.

FIG. 17 is a data flow diagram illustrating an example embodiment of a color modification system 199. The color modification system 199 may include a color modifier 202 that receives a digital image 200 and the chroma LUT 198, and that generates a chroma-modified digital image 204. The color modifier 202 may chroma modify the digital image 200 in accordance with the flowchart of FIG. 18.

Figure 18:
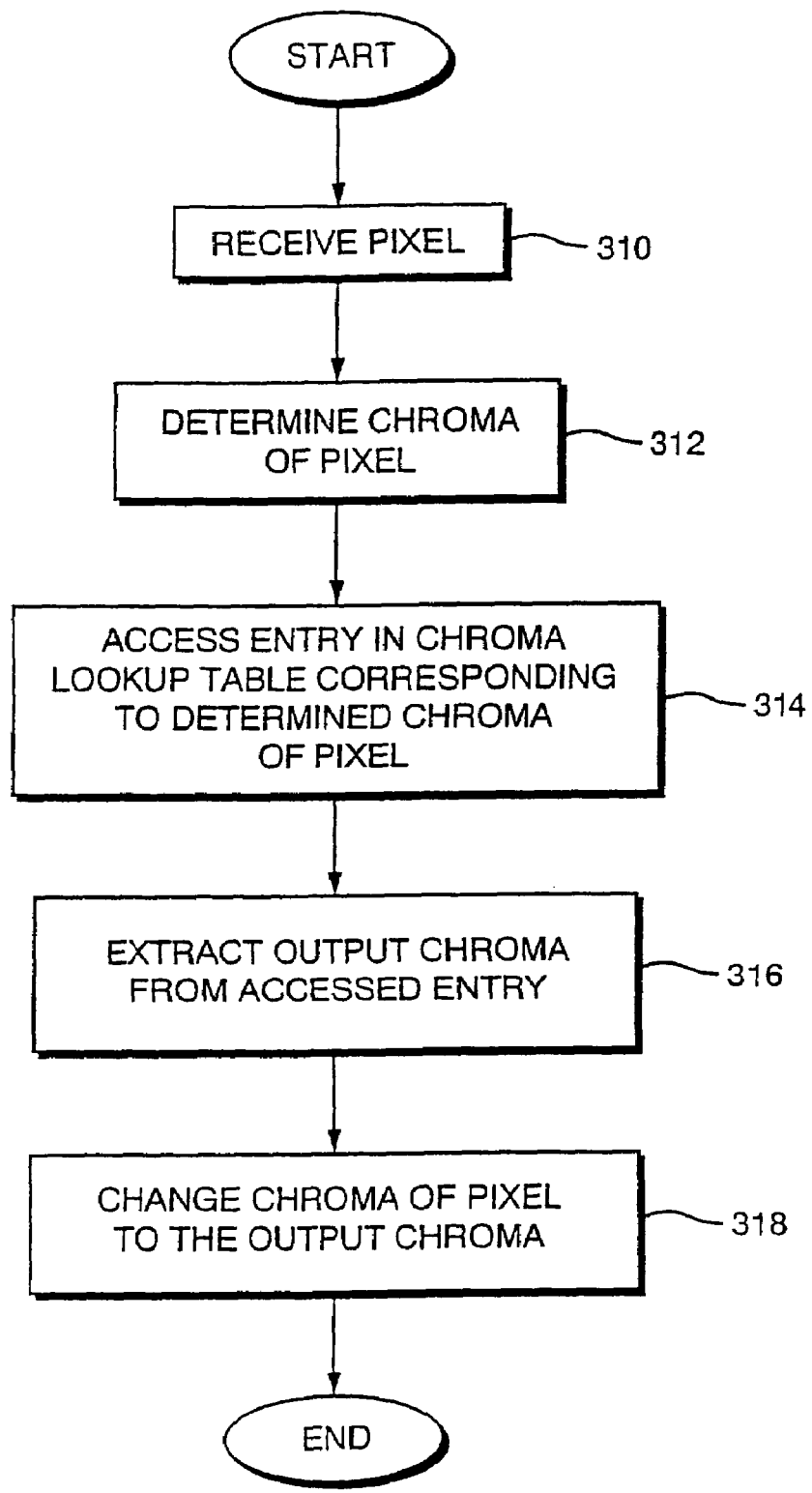
FIG. 18 is a flowchart illustrating an example embodiment of modifying a digital image with a chroma lookup table.

FIG. 18 is a flowchart illustrating an example embodiment of chroma modifying a digital image in accordance with a chroma LUT. In step 310 a pixel of a digital image may be received, and in step 312 the chroma of the pixel may be determined. Next, in step 314 an entry of the chroma LUT corresponding to the determined pixel chroma may be accessed.

Next, in step 316, the output chroma stored in the accessed entry may be extracted, and in step 318 the chroma of the received pixel may be changed to the extracted output chroma.

A lookup table (LUT) may be loaded with calculated chroma values to implement the chroma modifications that are defined. The LUT may be implemented in software or in hardware. An initial state of this LUT is a pass through, i.e., its output is identical to its input. A hardware LUT may be implemented so that it may be initialized to this state.

If the hardware LUT is initialized to a pass through state, the amount of data to be transferred to the hardware LUT may be reduced by sending data only for those entries that have changed. To identify these changed values efficiently, for each CrIndex value, the minimum and maximum CbIndex is tracked for which a change to the CrOutput and CbOutput values is calculated. Then for each row of the LUT, i.e., for each specific CrIndex value, only those entries between the tracked minimum and maximum CbIndex values for that values are transferred to the hardware.

A bounding box may be used to limit the extent of processing in a space. Such a bounding box may be used to limit processing in the chroma space around a specified wedge. Calculation of a bounding box around a wedge may be performed in the following manner, which is presented by way of example only. First, end points of line segments that define the wedge, i.e., minBoundCr2, minBoundCb2, maxBoundCr2 and maxBoundCb2, are established by the following equations:

sat=128.0*square root (2.0), minBound$Cr$1=0.0, minBound$Cb1$=0.0, minBound$Cr2$=sat*cos (minAngle), minBound$Cb2$=sat*sin (minAngle), maxBound$Cr1$=0.0, maxBound$Cb1$=0.0, maxBound$Cr2$=sat*cos (maxAngle), and maxBound$Cb2$=sat*sin (maxAngle).

A bounding rectangle around the wedge then may be defined by the four values in the following manner:

$Cr$Min=minimum of (minBound$Cr1$, minBound$Cr2$, maxBound$Cr1$, maxBound$Cr2$)−1, $Cr$Max=maximum of (minBound$Cr1$, minBound$Cr2$, maxBound$Cr1$, maxBound$Cr2$)+1, $Cb$Min=minimum of (minBound$Cb1$, minBound$Cb2$, maxBound$Cb1$, maxBound$Cb2$)−1, and $Cb$Max=maximum of (minBound$Cb1$, min-Bound$Cb2$, maxBound$Cb1$, maxBound$Cb3$)+1.

If the width of the wedge is 90 degrees or more, it is possible that, at some angles, the bounding box defined in this manner might not be big enough. To simplify defining the bounding box, the bounding box may be redefined using the following equations:
if ((CrMin equals−128.0 and CrMax equals 127.0) or
 (CbMin equals−128.0 and CbMax equals 127.0) or
 (hue_wid_in/2>=PI/3.0)),
then CrMin=−128.0,
 CrMax=127.0,
 CbMin=−128.0, and
 CbMax=127.0.

A point Cr,Cb is then within the bounding box if CrMin<=Cr<=CrMax and CbMin<=Cb<=CbMax.

Calculation of a bounding box around an ellipse may be done in the following manner. First, the foci of the ellipse are identified using the following algorithm, where "a" is half the length of the major axis and "b" is half the length of the minor axis:
if the ellipse is oriented radially, then
 angleMajorAxis=inAngle;
else angleMajorAxis=inAngle−$PI/2$ angleMinorAxis=angleMajorAxis+$PI/2$ focalDistance=sqrt($a*a-b*b$)

$f$ Cos=focalDistance*cos (angleMajorAxis)

$f$ Sin=focalDistance*sin (angleMajorAxis)

$F1x$=in$Cr$+$f$ Cos $F1y$=in$Cb$+$f$ Sin $F2x$=in$Cr$−$f$ Cos $F2y$=in$Cb$−$f$ Sin

After computing the foci of the ellipse, to define a bounding rectangle around the ellipse, the following equations may be used:

if the ellipse is oriented radially, then $a$ Cos=$a$*cos (angleMajorAxis)

$a$ Sin=$a$*sin (angleMajorAxis)

$V1x$=in$Cr$+$a$ Cos //vertices on the major axis $V1y$=in$Cb$+$a$ Sin $V2x$=in$Cr$−$a$ Cos $V2y$=in$Cb$−$a$ Sin TangentialAngle=angleMinorAxis
tangentialDistance=b,
else $b$ Cos=$b$*cos (angleMinorAxis)

$b$ Sin=$b$*sin (angleMinorAxis)

$V1x$=in$Cr$+$b$ Cos //vertices on the minor axis $V1y$=in$Cb$+$b$ Sin $V2x$=in$Cr$−$b$ Cos $V2y$=in$Cb$−$b$ Sin TangentialAngle=angleMajorAxis
tangentialDistance=a $t$ Cos=tangentialDistance*cos (tangentialAngle)

$t$ Sin=tangentialDistance*sin (tangentialAngle)

$U1x$=$V1x$+$t$ Cos $U1y$=$V1y$+$t$ Sin $U2x$=$V1x$−$t$ Cos $U2y$=$V1y$−$t$ Sin $U3x$=$V2x$+$t$ Cos $U3y$=$V2y$+$t$ Sin $U4x$=$V2x$−$t$ Cos $U4y$=$V2y$−$t$ Sin

From these values, the following may be computed to define the rectangle:

$Cr$Min=MIN($U1x$, MIN($U2x$, MIN($U3x,U4x$)))−1

$Cr$Max=MAX($U1x$, MAX($U2x$, MAX($U3x,U4x$)))+1

$Cb$Min=MIN($U1y$, MIN($U2y$, MIN($U3y,U4y$)))−1

$Cb$Max=MAX($U1y$, MAX($U2y$, MAX($U3y,U4y$)))+1

A point Cr,Cb is then within the bounding box if CrMin<=Cr<=CrMax and CbMin<=Cb<=CbMax.

Having now described some embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the inventive subject matter described herein. In particular, although many of the examples presented herein involve specific combinations of method steps or apparatus elements, it should be understood that those steps and those elements may be combined in other ways to accomplish the same objectives. Steps, elements and features discussed only in connection with one embodiment are not intended to be excluded from a similar role in other embodiments.

What is claimed is:

1. A system for facilitating secondary color modification of moving images, comprising:
 a general purpose computer system programmed for digital, non-linear video editing and including a display;
 a graphical user interface displayed on the display of the general purpose computer system and comprising:
 a source chroma wheel display for displaying one or more source chroma regions;
 a destination chroma wheel display for displaying one or more destination chroma regions, wherein the destination chroma wheel display is simultaneously displayed with the source chroma wheel display;
 wherein each of the one or more source chroma regions and the one or more destination chroma regions represents a set of chroma values;
 wherein each source chroma region has a corresponding destination chroma region so as to define a mapping of input chroma values to output chroma values, thereby defining a secondary color modification;
 wherein the graphical user interface provides a plurality of types of controls for adjusting each of the one or more source chroma regions and the one or more destination chroma regions; and
 wherein the general purpose computer system is programmed to include means for performing, on at least one image, the secondary color modification.

2. The system of claim 1, wherein one of the types of controls comprises a text box for permitting a user to input a value for a parameter defining the chroma region.

3. The system of claim 2, wherein one of the types of controls comprises a slider for permitting a user to select a value from a range of values for a parameter defining the chroma region, according to a position of the slider that may be adjusted by the user.

4. The system of claim 3, wherein one of the types of controls comprises a pointing device for permitting a user to select and to manipulate directly a portion of a graphical representation of a chroma region on one of the source and destination chroma wheel displays to adjust a parameter corresponding to the portion and defining the chroma region.

5. The system of claim 4, wherein one of the types of controls comprises a selection mechanism for permitting a user to select one or more pixels from an image to which a chroma region is automatically fit.

6. The system of claim 3, wherein one of the types of controls comprises a selection mechanism for permitting a user to select one or more pixels from an image to which a chroma region is automatically fit.

7. The system of claim 2, wherein one of the types of controls comprises a pointing device for permitting a user to select and to manipulate directly a portion of a graphical representation of a chroma region on one of the source and destination chroma wheel displays to adjust a parameter corresponding to the portion and defining the chroma region.

8. The system of claim 7, wherein one of the types of controls comprises a selection mechanism for permitting a user to select one or more pixels from an image to which a chroma region is automatically fit.

9. The system of claim 2, wherein one of the types of controls comprises a selection mechanism for permitting a user to select one or more pixels from an image to which a chroma region is automatically fit.

10. The system of claim 1, wherein one of the types of controls comprises a slider for permitting a user to select a value from a range of values for a parameter defining the chroma region, according to a position of the slider that may be adjusted by the user.

11. The system of claim 10, wherein one of the types of controls comprises a pointing device for permitting a user to select and to manipulate directly a portion of a graphical representation of a chroma region on one of the source and destination chroma wheel displays to adjust a parameter corresponding to the portion and defining the chroma region.

12. The system of claim 11, wherein one of the types of controls comprises a selection mechanism for permitting a user to select one or more pixels from an image to which a chroma region is automatically fit.

13. The system of claim 10, wherein one of the types of controls comprises a selection mechanism for permitting a user to select one or more pixels from an image to which a chroma region is automatically fit.

14. The system of claim 1, wherein one of the types of controls comprises a pointing device for permitting a user to select and to manipulate directly a portion of a graphical representation of a chroma region on one of the source and destination chroma wheel displays to adjust a parameter corresponding to the portion and defining the chroma region.

15. The system of claim 14, wherein one of the types of controls comprises a selection mechanism for permitting a user to select one or more pixels from an image to which a chroma region is automatically fit.

16. The system of claim 1, wherein one of the types of controls comprises a selection mechanism for permitting a user to select one or more pixels from an image to which a chroma region is automatically fit.

17. The system of claim 1, wherein the destination color wheel display is displayed in horizontal alignment with the source color wheel display.

18. The system of claim 1, wherein the destination color wheel display is displayed horizontally adjacent to the source color wheel display.

19. The system of claim 1, wherein one of the types of controls is a chroma match control permitting a user to select one or more chroma values for a source chroma region, and to select one or more chroma values for a corresponding destination chroma region.

20. The system of claim 1, wherein the means for performing includes a lookup table that provides, for each chroma input value, a corresponding chroma output value according to the defined secondary color modification.

21. The system of claim 1, wherein at least two source chroma regions overlap within the source chroma wheel display.

22. The system of claim 21, wherein one of the at least two overlapping source chroma regions has precedence, and wherein the means for performing includes applying the secondary color modification corresponding to the source chroma region that has precedence.

23. The system of claim 21, wherein the means for performing includes applying the secondary color modifications corresponding to the at least two source chroma regions sequentially.

24. A system for facilitating secondary color modification of moving images, comprising:
 a general purpose computer system programmed for digital, non-linear video editing and including a display;
 a graphical user interface displayed on a display of the general purpose computer and comprising:

a chroma region input graph for displaying a representation of one or more chroma regions;

a chroma modification graph for displaying a representation of one or more chroma regions, wherein the chroma modification graph is simultaneously displayed with the chroma region input graph;

wherein each chroma region on the chroma input graph and each chroma region on the chroma modification graph represents a set of chroma values;

wherein the graphical user interface provides a plurality of types of controls for modifying chroma region parameters that define each of the one or more chroma regions in the chroma region input graph;

wherein the graphical user interface provides a plurality of types of controls for modifying chroma modification parameters that define each of the one or more chroma regions in the chroma modification graph; and wherein each chroma region on the chroma region input graph has a corresponding chroma region on the chroma modification graph so as to define a mapping of input chroma values to output chroma values, thereby defining a secondary color modification; and wherein the general purpose computer system is programmed to include means for performing, on at least one image, the secondary color modification defined by the one or more chroma regions and the corresponding one or more chroma modification regions.

25. The system of claim 1, wherein the secondary color modification is performed in real time.

26. The system of claim 24, wherein the secondary color modification is performed in real time.

* * * * *